United States Patent
Hansen et al.

(10) Patent No.: US 9,191,092 B2
(45) Date of Patent: *Nov. 17, 2015

(54) METHOD AND SYSTEM FOR COMPROMISE GREENFIELD PREAMBLES FOR 802.11N

(71) Applicant: BROADCOM CORPORATION, Irvine, CA (US)

(72) Inventors: Christopher J. Hansen, Los Altos, CA (US); Rajendra T. Moorti, Mountain View, CA (US); Jason A. Trachewsky, Menlo Park, CA (US)

(73) Assignee: BROAD CORPORATION, Irvine, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/592,140

(22) Filed: Jan. 8, 2015

(65) Prior Publication Data

US 2015/0124794 A1  May 7, 2015

Related U.S. Application Data

(63) Continuation of application No. 14/251,983, filed on Apr. 14, 2014, now Pat. No. 8,964,521, which is a continuation of application No. 11/151,772, filed on Jun. 9, 2005, now Pat. No. 8,737,189.

(60) Provisional application No. 60/653,429, filed on Feb. 16, 2005.

(51) Int. Cl.
*H04J 11/00* (2006.01)
*H04B 7/06* (2006.01)
(Continued)

(52) U.S. Cl.
CPC ............... *H04B 7/0667* (2013.01); *H04B 7/02* (2013.01); *H04B 7/024* (2013.01); *H04B 7/0413* (2013.01);
(Continued)

(58) Field of Classification Search
CPC ...... H04B 7/024; H04B 7/028; H04B 7/0404; H04B 7/0413; H04B 7/0452; H04B 7/0495; H04B 7/0486; H04B 7/0669; H04L 5/0048; H04L 5/005; H04L 5/0051; H04L 5/0053; H04L 25/03929; H04L 29/06102; H04L 29/0653; H04L 29/0863; H04L 69/161; H04L 67/147; H04W 52/0225; H04W 52/52
USPC ........................................................ 370/203
See application file for complete search history.

(56) References Cited

U.S. PATENT DOCUMENTS 7,027,530 B2 * 4/2006 McFarland et al. ........... 375/341
7,340,000 B1 * 3/2008 Hart et al. ..................... 375/260
(Continued)

OTHER PUBLICATIONS

"Parameter Optimization, Interleaving and Multiple Access in OFDM with Cyclic Delay diversity", Gerhard Bauch et al., 2004.*

*Primary Examiner* — Peter Cheng
(74) *Attorney, Agent, or Firm* — Garlick & Markison; Bruce E. Stuckman

(57) ABSTRACT

Aspects of the invention described herein may enable a greenfield access mode in IEEE 802.11n WLAN systems in comparison to an alternative approach that may not provide greenfield access. The utilization of greenfield access may reduce the portion of time required to transmit data due to overhead comprising preamble fields and header fields. This may enable higher data throughput rates to be achieved. This may further enable more robust transmission of data by enabling comparable data rates to be maintained while reducing the coding rate of encoded transmitted data. The reduction of the coding rate may enable comparable data rates to be maintained for transmission via RF channels characterized by lower SNR while still achieving desired target levels of packet error rates. In another aspect of the invention, mixed mode access may be achieved while reducing the portion of time required for transmitting data due to overhead.

20 Claims, 11 Drawing Sheets

(51) Int. Cl.
  *H04W 52/52*   (2009.01)
  *H04L 29/08*   (2006.01)
  *H04L 27/26*   (2006.01)
  *H04B 7/04*   (2006.01)
  *H04B 7/02*   (2006.01)
  *H04L 5/00*   (2006.01)
  *H04L 25/03*   (2006.01)
  *H04L 29/06*   (2006.01)
  *H04W 52/02*   (2009.01)
  *H04L 25/02*   (2006.01)
  *H04W 84/12*   (2009.01)

(52) U.S. Cl.
  CPC ............ *H04L 5/0026* (2013.01); *H04L 5/0048* (2013.01); *H04L 5/0053* (2013.01); *H04L 27/2613* (2013.01); *H04L 29/0863* (2013.01); *H04L 67/147* (2013.01); *H04L 69/161* (2013.01); *H04W 52/52* (2013.01); *H04B 7/028* (2013.01); *H04B 7/0404* (2013.01); *H04B 7/0452* (2013.01); *H04B 7/0486* (2013.01); *H04B 7/0495* (2013.01); *H04B 7/0669* (2013.01); *H04L 5/005* (2013.01); *H04L 5/0051* (2013.01); *H04L 25/0226* (2013.01); *H04L 25/03929* (2013.01); *H04L 29/0653* (2013.01); *H04L 29/06102* (2013.01); *H04W 52/0225* (2013.01); *H04W 84/12* (2013.01)

(56) References Cited

U.S. PATENT DOCUMENTS

| | | | | |
|---|---|---|---|---|
| 7,372,925 | B2 * | 5/2008 | Pipilos | 375/345 |
| 2004/0085917 | A1 * | 5/2004 | Fitton et al. | 370/292 |
| 2005/0170831 | A1 * | 8/2005 | Magee et al. | 455/434 |
| 2005/0276347 | A1 * | 12/2005 | Mujtaba et al. | 375/299 |
| 2009/0238299 | A1 * | 9/2009 | van Zelst et al. | 375/267 |

* cited by examiner

METHOD AND SYSTEM FOR COMPROMISE GREENFIELD PREAMBLES FOR 802.11N

CROSS-REFERENCE TO RELATED APPLICATIONS/INCORPORATION BY REFERENCE

The present U.S. Utility Patent Application claims priority pursuant to 35 U.S.C. §120 as a continuation of U.S. Utility application Ser. No. 14/251,983, entitled "METHOD AND SYSTEM FOR COMPROMISE GREENFIELD PREAMBLES FOR 802.11N", filed Apr. 14, 2014, issued as U.S. Pat. No. 8,964,521 on Feb. 24, 2015 which is a continuation of U.S. Utility application Ser. No. 11/151,772, entitled "METHOD AND SYSTEM FOR COMPROMISE GREENFIELD PREAMBLES FOR 802.11N", filed Jun. 9, 2005, issued as U.S. Pat. No. 8,737,189 on May 27, 2014, which claims priority pursuant to 35 U.S.C. §119(e) to U.S. Provisional Application No. 60/653,429, entitled "METHOD AND SYSTEM FOR COMPROMISE GREENFIELD PREAMBLES FOR 802.11N", filed Feb. 16, 2005, all of which are hereby incorporated herein by reference in their entirety and made part of the present U.S. Utility Patent Application for all purposes.

This application makes reference to:
U.S. patent application Ser. No. 10/973,595 filed Oct. 26, 2004, issued as U.S. Pat. No. 7,423,989 on Sep. 9, 2008;
U.S. patent application Ser. No. 11/052,353 filed Feb. 7, 2005, issued as U.S. Pat. No. 7,564,914 on Jul. 21, 2009; and
U.S. patent application Ser. No. 11/052,389 filed Feb. 7, 2005, issued as U.S. Pat. No. 7,616,955 on Nov. 10, 2009.

All of the above stated applications are hereby incorporated herein by reference in their entirety.

FIELD OF THE INVENTION

Certain embodiments of the invention relate to wireless communication. More specifically, certain embodiments of the invention relate to a method and system for compromise greenfield preambles for 802.11n.

BACKGROUND OF THE INVENTION

Within the IEEE organization, IEEE 802.11 task group N (TGn) has been chartered to develop a standard to enable WLAN devices to achieve throughput rates beyond 100 Mbits/s. This standard may be documented in IEEE resolution 802.11n.

The Institute for Electrical and Electronics Engineers (IEEE), in resolution IEEE 802.11, also referred as "802.11", has defined a plurality of specifications which are related to wireless networking With current existing 802.11 standards, such as 802.11(a),(b),(g), which may support up to 54 Mbps data rates, either in 2.4 GHz or in 5 GHz frequency bands. Within the IEEE organization, IEEE 802.11 task group N (TGn) has been chartered to develop a standard to enable WLAN devices to achieve throughput rates beyond 100 Mbits/s. This standard may be documented in IEEE resolution 802.11n. A plurality of proposals is emerging as candidates for incorporation in IEEE resolution 802.11n. Among them are proposals from TGn Sync, which is a multi-industry group working to define proposals for next generation wireless networks that are to be submitted for inclusion in IEEE 802.11n. The proposals may be based upon what may be referred as a "sounding frame". The sounding frame method may comprise the transmitting of a plurality of long training sequences (LTSs) that match the number of transmitting antenna at the receiving mobile terminal. The sounding frame method may not utilize beamforming or cyclic delay diversity (CDD). In the sounding frame method, each antenna in a multiple input multiple output (MIMO) system may transmit independent information.

Further limitations and disadvantages of conventional and traditional approaches will become apparent to one of skill in the art, through comparison of such systems with some aspects of the present invention as set forth in the remainder of the present application with reference to the drawings.

BRIEF SUMMARY OF THE INVENTION

A system and/or method for compromise greenfield preambles for 802.11n, substantially as shown in and/or described in connection with at least one of the figures, as set forth more completely in the claims.

These and other advantages, aspects and novel features of the present invention, as well as details of an illustrated embodiment thereof, will be more fully understood from the following description and drawings.

DETAILED DESCRIPTION OF THE INVENTION

Certain embodiments of the invention relate to a method and system for compromise greenfield preambles for 802.11n, which utilizes a channel sounding mechanism to communicate information between a transmitter and a receiver. Various embodiments of the invention may enable a greenfield access mode in IEEE 802.11n WLAN systems compared to an alternative approach that may not provide methods for greenfield access. The utilization of greenfield access may reduce the portion of time required to transmit data due to overhead comprising preamble fields and header fields. This may enable higher data throughput rates to be achieved. This may further enable more robust transmission of data by enabling comparable data rates to be maintained while reducing the coding rate of encoded transmitted data. The reduction of the coding rate may enable comparable data rates to be maintained for transmission via RF channels characterized by lower SNR while still achieving desired target levels of packet error rates.

In another embodiment of the invention, mixed mode access may be achieved while reducing a portion of time required for transmitting data due to overhead comprising preamble fields and header fields. Long training fields among a plurality of transmitted spatial streams may comprise orthonormal long training sequences, which may obviate tone interleaving. Utilizing orthonormal long training sequences may enable the transmission of identical symbols via a plurality of spatial streams.

Figure 1:
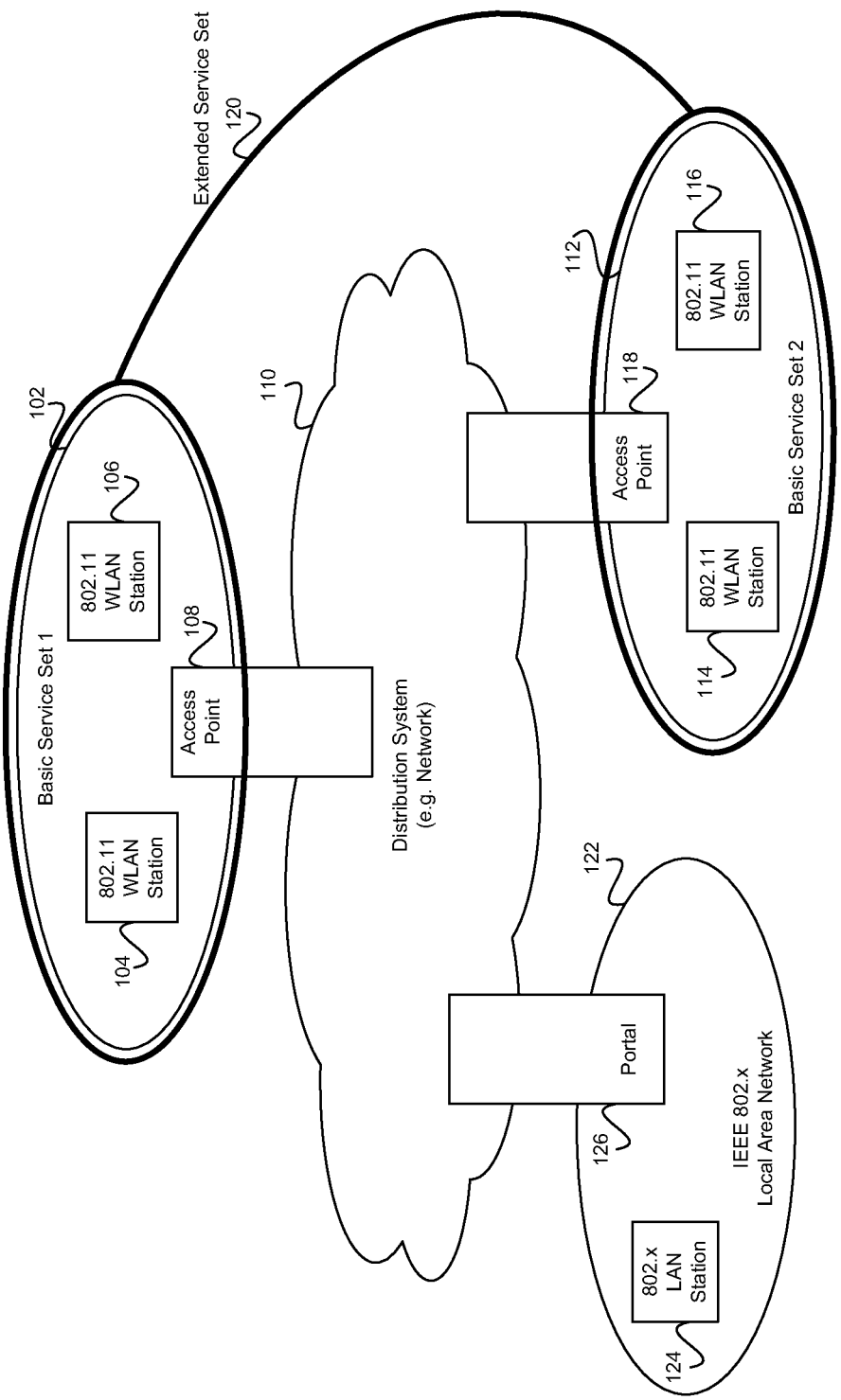
FIG. 1 is a block diagram of an exemplary system for wireless data communications, which may be utilized in accordance with an embodiment of the invention.

FIG. 1 is a block diagram of an exemplary system for wireless data communications, which may be utilized in accordance with an embodiment of the invention. With reference to FIG. 1 there is shown a distribution system (DS) 110, an extended service set (ESS) 120, and an IEEE 802.x LAN 122. The ESS 120 may comprise a first basic service set (BSS) 102, and a second BSS 112. The first BSS 102 may comprise a first 802.11 WLAN station 104, a second 802.11 WLAN station 106, and an access point (AP) 108. The second BSS 112 may comprise a first 802.11 WLAN station 114, a second 802.11 WLAN station 116, and an access point (AP) 118. The IEEE 802.x LAN 122 may comprise an 802.x LAN station 124, and a portal 126.

The BSS 102 or 112 may be part of an IEEE 802.11 WLAN that comprises at least 2 IEEE 802.11 WLAN stations, for example, the first 802.11 WLAN station 104, the second 802.11 WLAN station 106, and the AP 108, which may be members of the BSS 102. Non-AP stations within BSS 102, the first 802.11 WLAN station 104, and the second 802.11 WLAN station 106, may individually form an association with the AP 108. An AP, such as AP 108, may be implemented as an Ethernet switch, bridge, or other device in a WLAN, for example. Similarly, non-AP stations within BSS 112, the first 802.11 WLAN station 114, and the second 802.11 WLAN station 116, may individually form an association with the AP 118. Once an association has been formed between a first 802.11 WLAN station 104 and an AP 108, the AP 108 may communicate reachability information about the first 802.11 WLAN station 104 to other APs associated with the ESS 120, such as AP 118, and portals such as the portal 126. In turn, the AP 118 may communicate reachability information about the first 802.11 WLAN station 104 to stations in BSS 112. The portal 126, which may be implemented as, for example, an Ethernet switch or other device in a LAN, may communicate reachability information about the first 802.11 WLAN station 104 to stations in LAN 122 such as the 802.x LAN station 124. The communication of reachability information about the first 802.11 WLAN station 104 may enable WLAN stations that are not in BSS 102, but are associated with ESS 120, to communicate with the first 802.11 WLAN station 104.

The DS 110 may provide an infrastructure which enables a first 802.11 WLAN station 104 in one BSS 102, to communicate with a first 802.11 WLAN station 114 in another BSS 112. The DS 110 may also enable a first 802.11 WLAN station 104 in one BSS 102 to communicate with an 802.x LAN station 124 in an IEEE 802.x LAN 122, implemented as, for example a wired LAN. The AP 108, AP 118, or portal 126 may provide a means by which a station in a BSS 102, BSS 112, or LAN 122 may communicate information via the DS 110. The first 802.11 WLAN station 104 in BSS 102 may communicate information to a first 802.11 WLAN station 114 in BSS 112 by transmitting the information to AP 108, which may transmit the information via the DS 110 to AP 118, which in turn may transmit the information to station 114 in BSS 112. The first 802.11 WLAN station 104 may communicate information to the 802.x LAN station 124 in LAN 122 by transmitting the information to AP 108, which may transmit the information via the DS 110 to the portal 126, which in turn may transmit the information to the 802.x LAN station 124 in LAN 122. The DS 110 may utilize wireless communications via an RF channel, wired communications, such as IEEE 802.x Ethernet, or a combination thereof.

The IEEE resolution 802.11n may enable WLAN devices compatible with IEEE 802.11n to also interoperate with IEEE 802.11 devices that are not compatible with IEEE 802.11n. WLAN devices that are compatible with IEEE 802.11 but are not compatible with IEEE 802.11n may be referred to as legacy IEEE 802.11 WLAN devices. WLAN devices that are compatible with IEEE 802.11n and communicate with other IEEE 802.11n compatible WLAN devices in an IEEE basic service set (BSS) of which no legacy IEEE 802.11 WLAN devices are currently members, may be capable of communicating in a greenfield access mode. When utilizing greenfield access, communications between the WLAN devices may utilize capabilities specified in IEEE 802.11n that may not be accessible to legacy WLAN devices. WLAN devices that are compatible with IEEE 802.11n, and that communicate with IEEE 802.11n compatible WLAN devices in an IEEE BSS, of which legacy IEEE 802.11 WLAN devices are currently members, may utilize mixed mode access. When utilizing mixed mode access, IEEE 802.11n compatible WLAN devices may utilize spoofing to avoid interference from legacy IEEE 802.11 WLAN devices during communications between IEEE 802.11n compatible devices in a BSS.

Among proposals received by TGn are proposals from, the worldwide spectrum efficiency (WWiSE) group and TGn Sync. Current proposals from TGn Sync may not provide a mechanism to support greenfield access. As such, mixed mode access communications based on current TGn Sync may be required to comprise information that may not be required in greenfield access communications.

The WWiSE proposals may comprise a plurality of enhancements to legacy IEEE 802.11 WLAN devices for incorporation in IEEE 802.11n WLAN devices. Legacy IEEE 802.11 WLAN devices may utilize 20 RF MHz channels.

IEEE 802.11n may utilize 20 MHz channels, with an optional utilization of 40 RF MHz channels. Legacy IEEE 802.11 WLAN devices may utilize 52 sub-band frequencies, or subcarriers, in a 20 MHz channel, comprising pilot tones at 4 sub-band frequencies, and 48 data-bearing subcarriers. IEEE 802.11n WLAN devices based on WWiSE proposals may utilize a total of 56 subcarriers in a 20 MHz channel, comprising 2 pilot tones, and 54 data-bearing subcarriers. The subcarriers may be distributed symmetrically around a frequency that comprises the center frequency of a 20 MHz channel. The frequency spacing between subcarriers in an IEEE 802.11n WLAN device may be approximately equal to 312.5 KHz. Therefore, an IEEE 802.11n 20 MHz channel may comprise a plurality of subcarriers for which the frequency of a subcarrier, $f_{sc}(i)$, may be represented as:

$$f_{sc}(i) = f_{center} + i\Delta_f, \text{where,} \qquad \text{equation[1]}$$

the frequency, $f_{center}$, may represent the center frequency in a 20 MHz channel, the frequency increment, $\Delta_f$, may represent the frequency spacing between subcarriers, and the value of the subcarrier index, i, may comprise a plurality of integer values represented as:

$$0 < i \leq N_{sc}/2, \text{ or} \qquad \text{equation[2a]}$$

$$-N_{sc}/2 \leq i < 0, \text{ where} \qquad \text{equation[2b]}$$

$N_{sc}$ may represent the number of subcarriers present in a 20 MHz channel.

An IEEE 802.11n 40 MHz channel may comprise a plurality of subcarriers for which the frequency of a subcarrier $f^{40}_{sc}(i)$ may be represented as:

$$f_{sc}^{40}(i) = f_{primary} + i\Delta_f, \text{ or} \qquad \text{equation[3a]}$$

$$f_{sc}^{40}(i) = f_{secondary} + i\Delta_f, \text{where} \qquad \text{equation[3b]}$$

$f_{primary}$ may represent the center frequency of a primary 20 MHz channel, $f_{secondary}$ may represent the center frequency of a secondary 20 MHz channel, and the index, i, may be as defined in equations [3a] and [3b]. The primary and secondary 20 MHz channels may be adjacent channels such that:

$$f_{secondary} = f_{primary} \pm 20 \text{ MHz, where} \qquad \text{equation[4]}$$

the secondary 20 MHz channel may be located at an adjacent channel for which the center frequency $f_{secondary}$ is either 20 MHz higher or 20 MHz lower than the center frequency of the primary 20 MHz channel $f_{primary}$. A 40 MHz channel may comprise a plurality of $N_{sc}$ subcarriers located at the primary 20 MHz channel, and subsequent plurality of $N_{sc}$ subcarriers located at the secondary 20 MHz channel, where $N_{sc}$ may represent the number of subcarriers in a 20 MHz channel. In this regard, a 40 MHz channel may comprise a total of $2N_{sc}$ subcarriers. The state of the secondary 20 MHz channel may not be evaluated during communications between IEEE 802.11n WLAN devices.

The WWiSE proposals may incorporate a plurality of MIMO antenna configurations represented as $N_{TX} \times N_{RX}$, where $N_{TX}$ may represent the number of transmitting antennas at a station. Transmitting antennas may be utilized to transmit signals via an RF channel. $N_{RX}$ may represent the number of receiving antenna at a station that receives the signals transmitted by the $N_{TX}$ transmitting antenna. The MIMO antenna configuration may enable IEEE 802.11n WLAN devices to achieve higher data rates than legacy IEEE 802.11 WLAN devices. A legacy 802.11 WLAN device may achieve data rates of 54 Mbits/s based on IEEE 802.11a specifications. By comparison, an IEEE 802.11n WLAN device may achieve data rates of 540 Mbits/s in a 4×4 MIMO configuration.

Figure 2A:
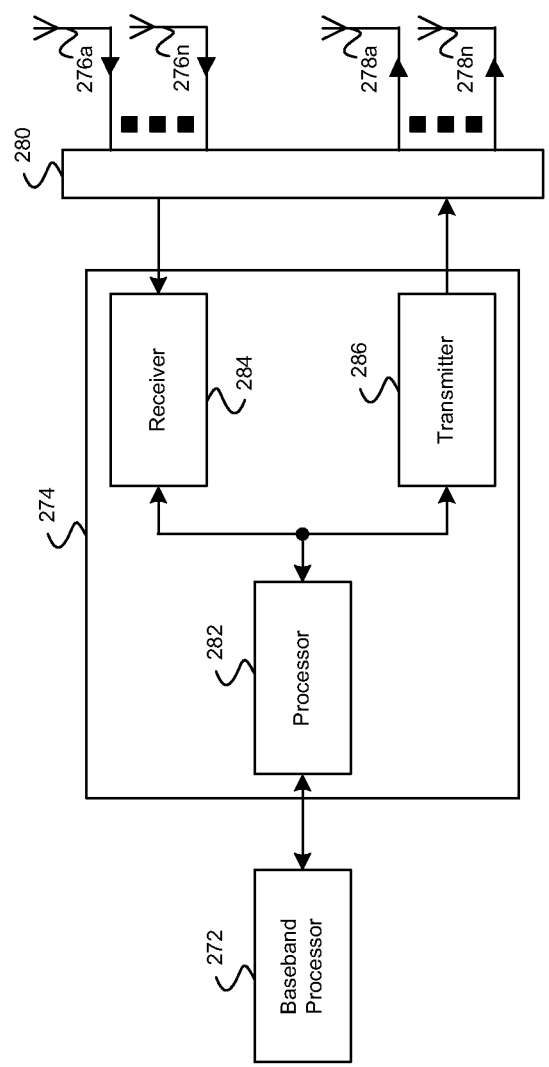
FIG. 2a is an exemplary block diagram of a transceiver which may be utilized in accordance with an embodiment of the invention.

FIG. 2a is an exemplary block diagram of a transceiver which may be utilized in accordance with an embodiment of the invention. With reference to FIG. 2a, there is shown a baseband processor 272, a transceiver 274, an RF front end 280, a plurality of receive antennas 276a, . . . , 276n, and a plurality of transmitting antennas 278a, . . . , 278n. The transceiver 274 may comprise a processor 282, a receiver 284, and a transmitter 286.

The processor 282 may be adapted to perform digital receiver and/or transmitter functions in accordance with applicable communications standards. These functions may comprise, but are not limited to, tasks performed at lower layers in a relevant protocol reference model. These tasks may further comprise the physical layer convergence procedure (PLCP), physical medium dependent (PMD) functions, and associated layer management functions. The baseband processor 272 may be adapted to perform functions in accordance with applicable communications standards. These functions may comprise, but are not limited to, tasks related to analysis of data received via the receiver 284, and tasks related to generating data to be transmitted via the transmitter 286. These tasks may further comprise medium access control (MAC) layer functions as specified by pertinent standards.

The receiver 284 may be adapted to perform digital receiver functions that may comprise, but are not limited to, fast Fourier transform processing, beamforming processing, equalization, demapping, demodulation control, deinterleaving, depuncture, and decoding. The transmitter 286 may perform digital transmitter functions that comprise, but are not limited to, coding, puncture, interleaving, mapping, modulation control, inverse fast Fourier transform processing, beamforming processing. The RF front end 280 may receive analog RF signals via antennas 276a, . . . , 276n, converting the RF signal to baseband and generating a digital equivalent of the received analog baseband signal. The digital representation may be a complex quantity comprising I and Q components. The RF front end 280 may also transmit analog RF signals via an antenna 278a, . . . , 278n, converting a digital baseband signal to an analog RF signal.

In operation, the processor 282 may receive data from the receiver 284. The processor 282 may communicate received data to the baseband processor 272 for analysis and further processing. The baseband processor 272 may generate data to be transmitted via an RF channel by the transmitter 286. The baseband processor 272 may communicate the data to the processor 282. The processor 282 may generate a plurality of bits that are communicated to the receiver 284.

Figure 2B:
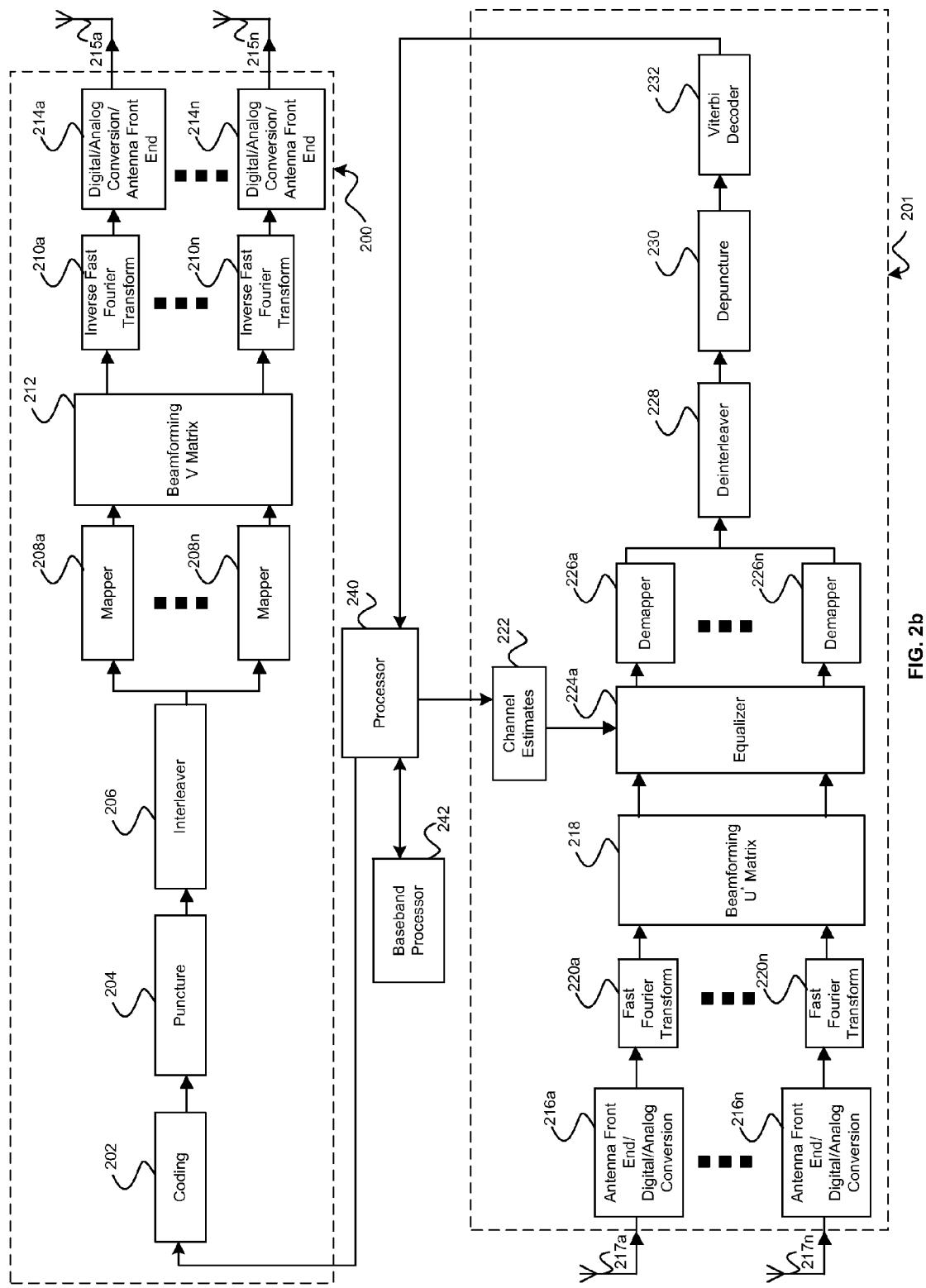
FIG. 2b is an exemplary block diagram of a transceiver comprising a transmitter and a receiver in a MIMO system, which may be utilized in accordance with an embodiment of the invention.

FIG. 2b is an exemplary block diagram of a transmitter and a receiver in a MIMO system, which may be utilized in accordance with an embodiment of the invention. With reference to FIG. 2b, there is shown a transmitter 200 a receiver 201, a processor 240, a baseband processor 242, a plurality of transmitter antennas 215a, . . . , 215n, and a plurality of receiver antennas 217a, . . . , 217n. The transmitter 200 may comprise a coding block 202, a puncture block 204, an interleaver block 206, a plurality of mapper blocks 208a, . . . , 208n, a plurality of inverse fast Fourier transform (IFFT) blocks 210a, . . . , 210n, a beamforming V matrix block 212, and a plurality of digital to analog (D/A) conversion and antenna front end blocks 214a, . . . , 214n. The receiver 201 may comprise a plurality of antenna front end and analog to digital (A/D) conversion blocks 216a, . . . , 216n, a beamforming U* matrix block 218, a plurality of fast Fourier transform (FFT) blocks 220a, . . . , 220n, a channel estimates block 222, an equalizer block 224a, a plurality of demapper blocks 226a, ..., 226n, a deinterleaver block 228, a depuncture block 230, and a Viterbi decoder block 232.

The variables V and U* in beamforming blocks 212 and 218, respectively refer to matrices utilized in the beamforming technique. U.S. application Ser. No. 11/052,389 filed Feb. 7, 2005, provides a detailed description of Eigen beamforming and is hereby incorporated herein by reference in its entirety.

The processor 240 may perform digital receiver and/or transmitter functions in accordance with applicable communications standards. These functions may comprise, but are not limited to, tasks performed at lower layers in a relevant protocol reference model. These tasks may further comprise the physical layer convergence procedure (PLCP), physical medium dependent (PMD) functions, and associated layer management functions. The baseband processor 242 may similarly perform functions in accordance with applicable communications standards. These functions may comprise, but are not limited to, tasks related to analysis of data received via the receiver 201, and tasks related to generating data to be transmitted via the transmitter 200. These tasks may further comprise medium access control (MAC) layer functions as specified by pertinent standards.

In the transmitter 200, the coding block 202 may transform received binary input data blocks by applying a forward error correction (FEC) technique such as, for example, binary convolutional coding (BCC). The application of FEC techniques, also known as "channel coding", may improve the ability to successfully recover transmitted data at a receiver by appending redundant information to the input data prior to transmission via an RF channel. The ratio of the number of bits in the binary input data block to the number of bits in the transformed data block may be known as the "coding rate". The coding rate may be specified using the notation $i_b/t_b$, where $t_b$ represents the total number of bits that comprise a coding group of bits, while $i_b$ represents the number of information bits that are contained in the group of bits $t_b$. Any number of bits $t_b-i_b$ may represent redundant bits that may enable the receiver 201 to detect and correct errors introduced during transmission. Increasing the number of redundant bits may enable greater capabilities at the receiver to detect and correct errors in information bits. The penalty for this additional error detection and correction capability may result in a reduction in the information transfer rates between the transmitter 200 and the receiver 201. The invention is not limited to BCC and a plurality of coding techniques such as, for example, Turbo coding, or low density parity check (LDPC) coding may also be utilized.

The puncture block 204 may receive transformed binary input data blocks from the coding block 202 and alter the coding rate by removing redundant bits from the received transformed binary input data blocks. For example, if the coding block 202 implemented a ½ coding rate, 4 bits of data received from the coding block 202 may comprise 2 information bits, and 2 redundant bits. By eliminating 1 of the redundant bits in the group of 4 bits, the puncture block 204 may adapt the coding rate from ½ to ⅔. The interleaver block 206 may rearrange bits received in a coding rate-adapted data block from the puncture block 204 prior to transmission via an RF channel to reduce the probability of uncorrectable corruption of data due to burst of errors, impacting contiguous bits, during transmission via an RF channel. The output from the interleaver block 206 may also be divided into a plurality of streams where each stream may comprise a non-overlapping portion of the bits from the received coding rate-adapted data block. Therefore, for a given number of bits in the coding rate-adapted data block, $b_{db}$, a given number of streams from the interleaver block 206, $n_{st}$, and a given number of bits assigned to an individual stream i by the interleaver block 206, $b_{st}(i)$:

$$b_{db} = \sum_{i=1}^{n_{st}} b_{st}(i) \qquad \text{equation [5]}$$

The plurality of mapper blocks 208a, ..., 208n may comprise a number of individual mapper blocks that is equal to the number of individual streams generated by the interleaver block 206. Each individual mapper block 208a, ..., 208n may receive a plurality of bits from a corresponding individual stream, mapping those bits into a "symbol" by applying a modulation technique based on a "constellation" utilized to transform the plurality of bits into a signal level representing the symbol. The representation of the symbol may be a complex quantity comprising in-phase (I) and quadrature (Q) components. The mapper block 208a ... 208n for stream i may utilize a modulation technique to map a plurality of bits, $b_{st}(i)$, into a symbol.

The beamforming V matrix block 212 may apply the beamforming technique to the plurality of symbols, or "spatial modes", generated from the plurality of mapper blocks 208a, ..., 208n. The beamforming V matrix block 212 may generate a plurality of signals where the number of signals generated may be equal to the number of transmitting antenna at the transmitter 200. Each signal in the plurality of signals generated by the beamforming V block 212 may comprise a weighted sum of at least one of the received symbols from the mapper blocks 208a, ..., 208n.

The plurality of IFFT blocks 210a, ..., 210n may receive a plurality of signals from the beamforming block 212. Each IFFT block 210a, ..., 210n may subdivide the bandwidth of the RF channel into a plurality of n sub-band frequencies to implement orthogonal frequency division multiplexing (OFDM), buffering a plurality of received signals. Each buffered signal may be modulated by a carrier signal whose frequency is based on of one of the sub-bands. Each of the IFFT blocks 210a, ..., 210n may then independently sum their respective buffered and modulated signals across the frequency sub-bands to perform an n-point IFFT, thereby generating a composite OFDM signal.

The plurality of digital (D) to analog (A) conversion and antenna front end blocks 214a, ..., 214n may receive the plurality of signals generated by the plurality of IFFT blocks 210a, ..., 210n. The digital signal representation received from each of the plurality of IFFT blocks 210a, ..., 210n may be converted to an analog RF signal that may be amplified and transmitted via an antenna. The plurality of D to A conversion and antenna front end blocks 214a, ..., 214n may be equal to the number of transmitting antenna 115a, ..., 115n at the transmitter 200. Each D to A conversion and antenna front end block 214a, ..., 214n may receive one of the plurality of signals from the beamforming V matrix block 212 and may utilize an antenna 115a, ..., 115n to transmit one RF signal via an RF channel.

In the receiver 201, the plurality antenna front end and A to D conversion blocks 216a, ..., 216n may receive analog RF signals via an antenna, converting the RF signal to baseband and generating a digital equivalent of the received analog baseband signal. The digital representation may be a complex quantity comprising I and Q components. The number of antenna front end and A to D conversion blocks 216a, ..., 216n may be equal to the number of receiving antenna 117a, ..., 117n at the receiver 201.

The plurality of FFT blocks 220a, ..., 220n may receive a plurality of signals from the plurality of antenna front end and A to D conversion blocks 216a, ..., 216n. The plurality of FFT blocks 220a, ..., 220n may be equal to the number of antenna front end and A to D conversion blocks 216a, ..., 216n. Each FFT block 220a, ..., 220n may receive a signal from an antenna front end and A to D conversion block 216a, ..., 216n, independently applying an n-point FFT technique, demodulating the signal by a plurality of carrier signals based on the n sub-band frequencies utilized in the transmitter 200. The demodulated signals may be mathematically integrated over one sub band frequency period by each of the plurality of FFT blocks 220a, ..., 220n to extract n symbols contained in each of the plurality of OFDM signals received by the receiver 201.

The beamforming U* block 218 may apply the beamforming technique to the plurality of signals received from the plurality of FFT blocks 220a, ..., 220n. The beamforming U* block 218 may generate a plurality of signals where the number of signals generated may be equal to the number of streams utilized in generating the signals at the transmitter 200. Each of the plurality of signals generated by the beamforming U* block 218 may comprise a weighted sum of at least one of the signals received from the FFT blocks 220a, ..., 220n.

The channel estimates block 222 may utilize preamble information contained in a received RF signal to compute channel estimates. The plurality of equalizer block 224 may receive signals generated by the beamforming U* block 218. The equalizer block 224 may process the received signals based on input from the channel estimates block 222 to recover the symbol originally generated by the transmitter 200. The equalizer block 224 may comprise suitable logic, circuitry, and/or code that may be adapted to transform symbols received from the beamforming U* block to compensate for fading in the RF channel.

The plurality of demapper blocks 226a ... 226n may receive symbols from the plurality of equalizer blocks 224a ... 224n, reverse mapping each symbol to a plurality of bits by applying a demodulation technique, based on the modulation technique utilized in generating the symbol at the transmitter 200, to transform the symbol into a plurality of bits. The plurality of demapper blocks 226a ... 226n may be equal to the number of equalizer blocks 224a ... 224n, which may also be equal to the number of streams in the transmitter 200.

The deinterleaver block 228 may receive a plurality of bits from each of the demapper blocks 226a ... 226n, rearranging the order of bits among the received plurality of bits. The deinterleaver block 228 may rearrange the order of bits from the plurality of demapper blocks 226a ... 226n in, for example, the reverse order of that utilized by the interleaver 206 in the transmitter 200. The depuncture block 230 may insert "null" bits into the output data block received from the deinterleaver block 228 that were removed by the puncture block 204. The Viterbi decoder block 232 may decode a depunctured output data block, applying a decoding technique that may recover the binary data blocks that were input to the coding block 202.

In operation, the processor 240 may receive decoded data from the Viterbi decoder 232. The processor 240 may communicate received data to the baseband processor 242 for analysis and further processing. The processor 240 may also communicate data received via the RF channel, by the receiver 201, to the channel estimates block 222. This information may be utilized by the channel estimates block 222, in the receiver 201, to compute channel estimates for a received RF channel. The baseband processor 242 may generate data to be transmitted via an RF channel by the transmitter 200. The baseband processor 242 may communicate the data to the processor 240. The processor 240 may generate a plurality of bits that are communicated to the coding block 202.

The elements shown in FIG. 2b may comprise components that may be present in an exemplary embodiment of a wireless communications terminal. One exemplary embodiment of a may be a wireless communications transmitter comprising a transmitter 200, a processor 240, and a baseband processor 242. Another exemplary embodiment of a may be a wireless communications receiver comprising a receiver 201, a processor 240, and a baseband processor 242. Another exemplary embodiment of a may be a wireless communications transceiver comprising a transmitter 200, a receiver 201, a processor 240, and a baseband processor 242.

Various embodiments of a MIMO system in an $N_{TX} \times N_{RX}$ antenna configuration may comprise a plurality of $N_{TX}$ digital to analog conversion and antenna front end blocks 214a ... 214n, and a plurality of $N_{RX}$ antenna front end and analog to digital conversion blocks 216a ... 216n.

Figure 3A:
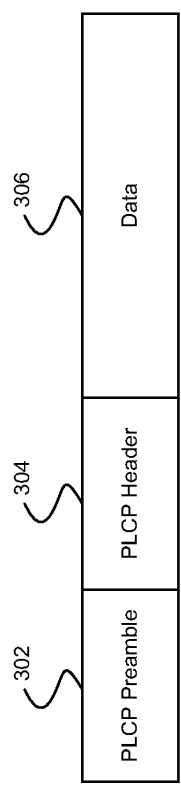
FIG. 3a illustrates an exemplary physical layer protocol data unit, which may be utilized in connection with an embodiment of the invention.

FIG. 3a illustrates an exemplary physical layer protocol data unit, which may be utilized in connection with an embodiment of the invention. With reference to FIG. 3a, there is shown a physical layer convergence protocol (PLCP) preamble field 302, a PLCP header field 304, and a data field 306. The preamble field 302 may be utilized by a receiver 201 in connection with the reception of signals via an RF channel. The header field 304 may comprise information that is utilized by a receiver 201 in connection with the processing of information in the data field 306. The data field 306 may comprise information that is transmitted by a transmitter 200 and received by a receiver 201.

Figure 3B:
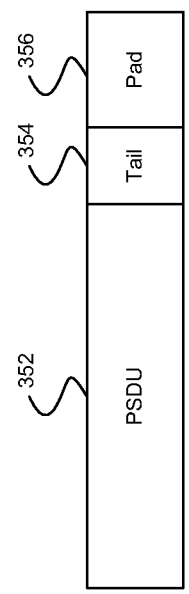
FIG. 3b illustrates an exemplary data field in a PPDU, which may be utilized in connection with an embodiment of the invention.

FIG. 3b illustrates an exemplary data field in a PPDU, which may be utilized in connection with an embodiment of the invention. With reference to FIG. 3b there is shown a physical layer service data unit (PSDU) field 352, a tail field 354, and a pad field 356. In an exemplary data field, as shown in FIG. 3b, the PSDU may comprise a media access control (MAC) layer frame received from the MAC layer in the IEEE 802.11 protocol stack. In an exemplary PPDU, as shown in FIG. 3a, the data field 306 may comprise 1,500 octets of binary data. The tail field 354 may comprise a plurality of bits, the number of which may depend upon the methods utilized to process the PSDU. The pad field 356 may comprise a plurality of bits, the number of which may depend upon a desired number of bits to be comprised in the data field.

Figure 4A:
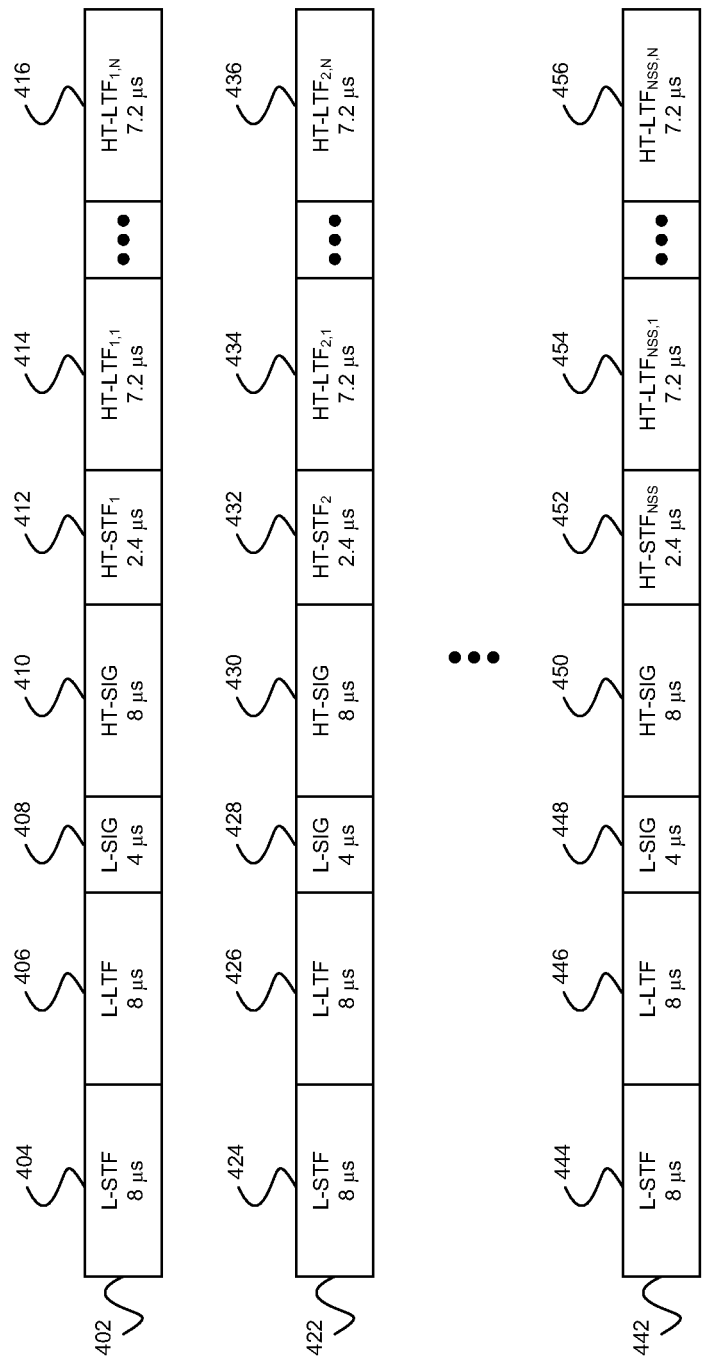
FIG. 4a shows exemplary training fields and header fields for mixed mode access in accordance with a TGn Sync proposal that may be utilized in connection with an embodiment of the invention.

FIG. 4a shows exemplary training fields and header fields for mixed mode access in accordance with a TGn Sync proposal that may be utilized in connection with an embodiment of the invention. With reference to FIG. 4a, there is shown a plurality of PPDU preambles and headers 402, 422, and 442. The preamble and header 402 may comprise a legacy short training field (L-STF) 404, a legacy long training field (L-LTF) 406, a legacy signal field (L-SIG) 408, a high throughput signal field (HT-SIG) 410, a high throughput short training field for the first spatial stream (HT-STF$_1$) 412, and a plurality of high throughput long training fields for the first spatial stream comprising training fields number 1 through N (HT-LTF$_{1,1}$ ... HT-LTF$_{1,N}$) 414 ... 416. The integer value N may represent the number of long training fields contained in the preamble and header 402.

Each of the legacy short training fields, L-STF 404, 424, and 444 may be approximately 8 μs in duration, or equivalent in time duration to 2 IEEE 802.11n OFDM symbols and corresponding guard interval times, where each symbol and guard interval may be of approximately 4 μs in duration. Each of the long training fields, L-LTF 406, 426, and 446 may be approximately 8 μs in duration, or equivalent in time duration to 2 IEEE 802.11n OFDM symbols and corresponding guard intervals. Each of the signal fields L-SIG 408, 428, and 448 may be approximately 4 μs in duration, or equivalent in time duration to 1 IEEE 802.11n OFDM symbol and corresponding guard interval. Each of the high throughput HT-SIG fields 410, 430, and 450 may be approximately 8 μs in duration, or equivalent in time duration to 2 IEEE 802.11n OFDM symbols and corresponding guard intervals. Each of the HT-STF fields 412, 432, and 452 may be approximately 2.4 μs in duration. Each of the plurality of HT-LTF$_{1,1}$ ... HT-LTF$_{1,N}$, HT-LTF$_{2,1}$ ... HT-LTF$_{2,N}$, ..., HT-LTF$_{NSS,1}$ ... HT-LTF$_{NSS,N}$ fields 414 ... 416, 434 ... 436, ..., 454 ... 456 may be approximately 7.2 μs in duration.

The preamble and header 422 may comprise a legacy short training field 424, a legacy long training field 426, a legacy signal field 428, a high throughput signal field 430, a high throughput short training field for the second spatial stream 432, and a plurality of high throughput long training fields for the second spatial stream comprising training fields number 1 through N 434 ... 436. The preamble and header 442 may comprise a legacy short training field 444, a legacy long training field 446, a legacy signal field 448, a high throughput signal field 450, a high throughput short training field for spatial stream number N$_{SS}$ 452, and a plurality of high throughput long training fields for spatial stream number N$_{SS}$ comprising training sequence fields number 1 through N 454 ... 456.

In operation, the integer value N$_{SS}$ may represent the number of spatial streams transmitted from a plurality of N$_{TX}$ antennas located at a WLAN station. The number long training fields, N, may be approximately equal to the number of spatial streams N$_{SS}$. The training field L-STF 424 may represent a time shifted version of the training field L-STF 404 based on a method such as cyclical diversity delay (CDD). The training field L-STF 444 may represent a CDD version of the training field L-STF 424. The training field L-LTF 426 may represent a CDD version of the training field L-LTF 406. The training field L-LTF 446 may represent a CDD version of the training field L-LTF 426. The signal field L-SIG 428 may represent a CDD version of the signal field L-SIG 408. The signal field L-SIG 448 may represent a CDD version of the signal field L-SIG 428. The signal field HT-SIG 430 may represent a CDD version of the signal field HT-SIG 410. The signal field HT-SIG 450 may represent a CDD version of the signal field HT-SIG 430.

The plurality of high throughput short training fields comprising HT-STF$_1$ 412, HT-STF$_2$ 432, and HT-STF$_{NSS}$ 452 may utilize tone interleaving. In the tone interleaving procedure, a plurality of N$_{TI}$ frequencies, or tones, from among the plurality of subcarrier frequencies within a 20 MHz or 40 MHz RF channel, may be utilized for transmission within a given training field, for example, the high throughput short training field 412, 432, or 452 transmitted via each of a plurality of N$_{SS}$ spatial streams. Tones may be interleaved by dividing the plurality N$_{TI}$ tones into a plurality of tone groups each comprising a plurality N$_{TI}$/N$_{SS}$ tones such that no tone group comprises a tone whose frequency is approximately equal to the frequency of a tone in another tone group. The HT-STF$_1$ may utilize tones from the first tone group, the HT-STF$_2$ may utilize tones from the second tone group, and so forth. Similarly, the plurality of long training fields HT-LTF$_{1,1}$ 414, HT-LTF$_{2,1}$ 434, and HT-LTF$_{NSS,1}$ 454, may utilize tone interleaving. The plurality of long training fields HT-LTF$_{1,N}$ 416, HT-LTF$_{2,N}$ 436, and HT-LTF$_{NSS,N}$ 456, may utilize tone interleaving.

Figure 4B:
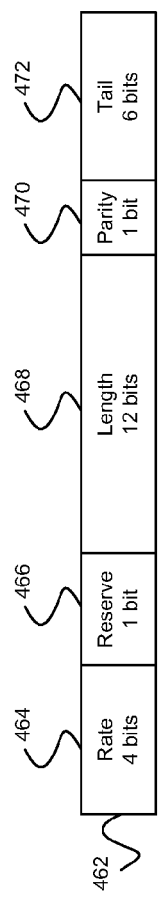
FIG. 4b shows an exemplary L-SIG header field for mixed mode access in accordance with a TGn Sync proposal that may be utilized in connection with an embodiment of the invention.

FIG. 4b shows an exemplary L-SIG header field for mixed mode access in accordance with a TGn Sync proposal that may be utilized in connection with an embodiment of the invention. With reference to FIG. 4b, there is shown an L-SIG header 462. The L-SIG header 462 may comprise a rate field 464, a reserve field 466, a length field 468, a parity field 470, and a tail field 472. The L-SIG header 462 may comprise 24 bits of binary information. The rate field 464 may comprise 4 bits of binary information. The reserve field 466 may comprise 1 bit of binary information. The length field 468 may comprise 12 bits of binary information. The parity field 470 may comprise 1 bit of binary information. The tail field 472 may comprise 6 bits of binary information.

Figure 4C:
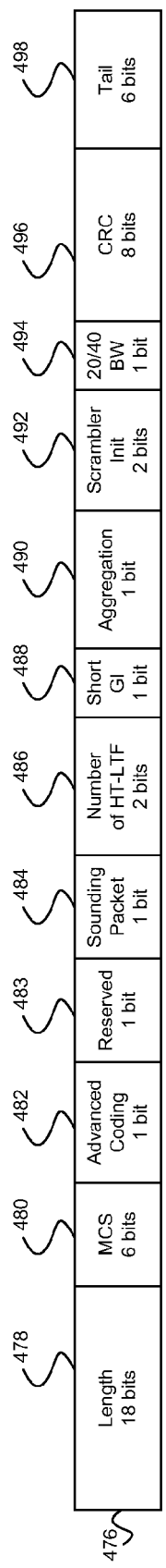
FIG. 4c shows an exemplary HT-SIG header field for mixed mode access in accordance with a TGn Sync proposal that may be utilized in connection with an embodiment of the invention.

FIG. 4c shows an exemplary HT-SIG header field for mixed mode access in accordance with a TGn Sync proposal that may be utilized in connection with an embodiment of the invention. With reference to FIG. 4c, there is shown an HT-SIG header field 476. The HT-SIG header may comprise a length field 478, a modulation and coding scheme (MCS) field 480, an advanced coding field 482, a reserved field 483, a sounding packet field 484, a number of HT-LTF field 486, a short guard interval (GI) field 488, an aggregation field 490, a scrambler initialization field 492, a 20 MHz or 40 MHz bandwidth (BW) field 494, a cyclical redundancy check field 496, and a tail field 498. The length field 478 may comprise 18 bits of binary information. The length field 478 may indicate the number of octets of binary information that is contained in the physical layer service data unit (PSDU) field 352 in the corresponding physical layer protocol data unit (PPDU). The MCS field 480 may comprise 6 bits of binary information. The MCS field 480 may indicate the modulation type and coding rate being utilized in the coding of the corresponding PPDU. The advanced coding field 482 may comprise 1 bit of binary information. The advanced coding field 482 may indicate whether binary convolutional coding (BCC), or low density parity check (LDPC) coding is utilized in the coding of the corresponding PPDU. The reserved field 483 may comprise 1 bit of binary information. The reserved field 483 may comprise no assigned utilization.

The sounding packet field 484 may comprise, for example, 1 bit of binary information. The sounding packet field 484 may indicate whether the corresponding PSDU may be utilized for closed loop calibration between a transmitter and a receiver. The number of HT-LTF field 486 may comprise 2 bits of binary information. The number of HT-LTF field 486 may indicate the number of high throughput long training fields contained in the corresponding PPDU. The short GI field 488 may comprise 1 bit of binary information. The short GI field 488 may indicate the length of the guard interval utilized when transmitting the data field 306 in the corresponding PPDU. The aggregation field 490 may comprise 1 bit of binary information. The aggregation field 490 may indicate whether the data field 306 in the corresponding PPDU comprises the last portion of a message. The scrambler init field 492 may comprise 2 bits of binary information. The scrambler init field 492 may be utilized to initialize a scrambler function at the WLAN station receiving the PPDU. The 20 MHz or 40 MHz bandwidth field 494 may comprise 1 bit of binary information. The 20 MHz or 40 MHz bandwidth field 494 may indicate whether the PPDU was transmitted utilizing a 20 MHz RF channel, or a 40 MHz RF channel. The CRC field 496 may comprise 8 bits of binary information. The CRC field 496 may be utilized for detecting and/or correcting errors in a received corresponding PPDU. The tail field 498 may comprise 6 bits of binary information. The tail field 498 may be utilized to extend the number of binary bits contained in an HT-SIG field to a desired length.

In an exemplary PPDU comprising 1,500 binary octets of data 306 (FIG. 3*a*), the data may comprise a time period of approximately 13 IEEE 802.11n OFDM symbols and corresponding guard bands in duration. This may be based on transmitting at a data rate of 243 Mbits/s while utilizing 2 spatial streams, 40 MHz bandwidth, 64 QAM modulation type, and a coding rate of ¾. Each OFDM symbol per spatial stream may comprise 486 bits of binary information for a combined 972 bits for the simultaneously transmitted OFDM symbols among the 2 spatial streams. The number of binary bits contained in an OFDM symbol, $N_{DBPS}$, may be determined based on:

$$N_{DBPS} = N_{DSC} * N_B(CON) * R, \text{ where} \qquad \text{equation[6]}$$

$N_{DSC}$, may represent the number of data bearing subcarriers in an RF channel, $N_B(CON)$ may represent the number of binary bits/symbol based on the modulation type, and R may represent the coding rate. For a 40 MHz RF channel, $N_{SC}$ may be approximately equal to 108. For a modulation type of 64 QAM, a symbol may comprise 6 binary bits. The total number of bits simultaneously transmitted via $N_{SS}$ number of spatial streams may equal approximately $N_{SS} \times N_{DBPS}$.

Data 306 comprising 1,500 binary octets may comprise a time duration of approximately 13 OFDM symbols and corresponding guard bands. In the PPDU preamble and header 402, legacy preamble, comprising the training fields L-STF 404, and L-LTF 406, and the signal field L-SIG 408, may comprise a time duration of approximately 5 OFDM symbols and corresponding guard bands. In the PPDU preamble and header 402, high throughput preamble and header, comprising the signal field HT-SIG 412, and training fields L-LTF 414 and L-LTF 416, may comprise a time duration of approximately 6 OFDM symbols and corresponding guard bands. The number of HT long training fields, N, may be equal to 2, for example.

A preamble and header 402, and data 306 comprising 1,500 binary octets, may produce a PPDU comprising a total time duration of approximately 24 OFDM symbols and corresponding guard bands in duration. Given a time duration of 4 µs for each OFDM symbol and corresponding guard band, the total time duration may be approximately 96 µs. Thus, the average data rate may be approximately equal to 1,500 binary octets, or 12,000 binary bits per 96 µs, or approximately 125 Mbits/s. Approximately 54% of the total duration may consist of data 306. Approximately 21% of the total duration may comprise legacy preamble. Approximately 25% of the total duration may comprise high throughput preamble and header.

Elimination of the legacy preamble from the preamble and header 402 may enable an increase in data rate efficiency based on a data field 306 comprising 1,500 binary octets. In this case, the average data rate may be approximately 12,000 binary bits per 76 µs, or approximately 158 Mbits/s, which is an increase of approximately 26% in the data rate.

If the modulation type were 64 QAM with the coding rate were decreased from ¾ to /2;3, each OFDM symbol may comprise 432 binary bits information. In this case, data comprising 1,500 binary octets may comprise a time duration of approximately 14 OFDM symbols and corresponding guard bands. Elimination of the legacy preamble from the preamble header 402 may produce an average data rate of approximately 12,000 binary bits per 80 µs, or approximately 150 Mbits/s, which is an increase of approximately 20% in the data rate.

If the modulation type were 64 QAM with the coding rate were decreased from ¾ to ½, each OFDM symbol may comprise 424 binary bits information. In this case, data comprising 1,500 binary octets may comprise a time duration of approximately 19 OFDM symbols and corresponding guard bands. Elimination of the legacy preamble from the preamble header 402 may produce an average data rate of approximately 12,000 binary bits per 100 µs, or approximately 120 Mbits/s, which is a decrease of approximately 4% in data rate.

A consequence of the ability to achieve coding rate reduction while maintaining comparable or higher data rates as a result of the elimination of legacy preamble from a PPDU may enable those comparable data rates to be maintained at lower signal to noise ratios (SNR) than may be achievable when utilizing a PPDU preamble and header 402 that comprises legacy preamble. A coding rate reduction from ¾ to ⅔ due to the elimination of legacy preamble resulting in greenfield access may correspond to at least 2 dB lower SNR for which a comparable, or higher, data rate may be maintained in comparison to a legacy preamble for mixed mode access PPDU with the preamble and header 402. This may be referred to as a greater than 2 dB performance gain for greenfield access relative to mixed mode access.

Utilization of LDPC coding to encode data 306 in a PPDU may produce a performance gain relative to the use of BCC coding. The performance gain realized from greenfield access may exceed that realized through the utilization of LDPC coding. Simulation results may show that LDPC provides a performance gain of 2 dB relative to BCC utilized as specified in IEEE 802.11a and in IEEE 802.11g. The utilization of LDPC may add some complexity to embodiments of the receiver 201.

Figure 5A:
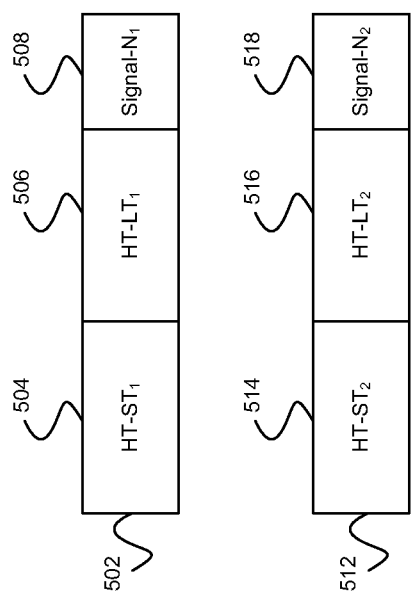
FIG. 5a shows exemplary training fields and header fields for greenfield access in accordance with a WWiSE proposal for $N_{SS}=2$, in accordance with an embodiment of the invention.

FIG. 5*a* shows exemplary training fields and header fields for greenfield access in accordance with a WWiSE proposal for $N_{SS}=2$, in accordance with an embodiment of the invention. With reference to FIG. 5*a*, there is shown training fields and header for a first spatial stream 502, and training fields and header for a second spatial stream 512. The training fields and header 502 may comprise a high throughput (HT) short training field for the first spatial stream (HT-ST$_1$) 504, a HT long training field for the first spatial stream (HT-LT$_1$) 506, and a Signal-N field for the first spatial stream (Signal-N$_1$) 508. The training fields and header 512 may comprise a HT short training field for the second spatial stream (HT-ST$_2$) 514, a HT long training field for the second spatial stream (HT-LT$_2$) 516, and a Signal-N field for the second spatial stream (Signal-N$_2$) 518.

In operation, a short training field may be utilized by a receiver for a plurality of reasons including, but not limited to, signal detection, automatic gain control (AGC) for low noise amplification circuitry, diversity selection performed by, for example, rake receiver circuitry, coarse frequency offset estimation, and timing synchronization. A long training field may be utilized by a receiver for a plurality of reasons, for example, fine frequency offset estimation, and channel estimation. The training field HT-ST$_2$ 514 may comprise a time shifted representation of the training field HT-ST$_1$ 504. The training field HT-LT$_2$ 516 may comprise a time shifted representation of the training field HT-LT$_1$ 506. The signal field Signal-N$_2$ 518 may comprise a time shifted representation of the signal field Signal-N$_1$ 508. The training fields, HT-ST$_1$ 504 and HT-ST$_2$ 514, may comprise a time duration of about 8 µs, and further comprise a plurality of OFDM symbols, for example, a plurality of 10 ODFM symbols. The training fields, HT-LT$_1$ 506 and HT-LT$_2$ 516, may comprise a time duration of about 8 µs, and further comprise a plurality of OFDM symbols, for example, a plurality of 2 ODFM symbols. The signal fields, Signal-$N_1$ 508 and Signal-$N_2$ 518, may comprise a time duration of about 4 μs, and further comprise an OFDM symbol.

Figure 5B:
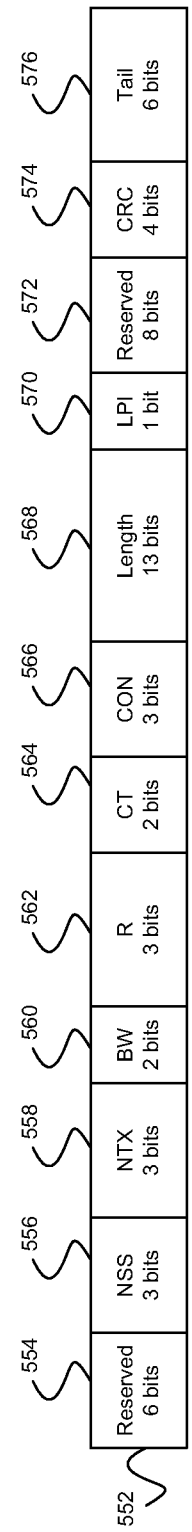
FIG. 5b shows an exemplary Signal-N header field for greenfield access in accordance with a WWiSE proposal, in accordance with an embodiment of the invention.

FIG. 5b shows an exemplary Signal-N header field for greenfield access in accordance with a WWiSE proposal, in accordance with an embodiment of the invention. With reference to FIG. 5b, there is shown a Signal-N header 552. The Signal-N header field may comprise a reserved field 554, a number of spatial streams ($N_{SS}$) field 556, a number of transmit antennas (NTX) field 558, a BW field 560, a coding rate (R) field 562, an error correcting code type (CT) field 564, a constellation type (CON) field 566, a length field 568, a last PSDU indicator (LPI) field 570, a reserved field 572, a CRC field 574, and a tail field 576. The reserved field 554 may comprise 6 bits of binary information. The reserved field 572 may comprise 8 bits of binary information. The reserved fields 554 and 572 may have no assigned usage. The $N_{SS}$ field 556 may comprise 3 bits of binary information. The $N_{SS}$ field 556 may indicate the number of spatial streams utilized in transmitting information from a transmitter, for example, transmitter 200, and a receiver, for example receiver 201. In a MIMO system, the number of spatial streams may represent a number, for example, 1, 2, 3, or 4. The NTX field 558 may comprise 3 bits of binary information. The NTX field 558 may indicate the number of transmitting antenna utilized in transmitting information between a transmitter and a receiver. In a MIMO system, the number of transmitting antenna may represent a number, for example, 1, 2, 3, or 4. The BW field 560 may comprise 2 bits of binary information. The BW field 560 may represent a bandwidth, for example, 20 MHz, or 40 MHz.

The R field 562 may comprise 3 bits of binary information. The R field 628 may indicate the coding rate that is utilized for transmitting a physical layer service data unit (PSDU) that is transmitted via an antenna. In a MIMO system, the coding rate may represent a number, for example, ½, ⅔, ¾, or ⅚. The CT field 564 may comprise 2 bits of binary information. The CT field 564 may indicate the error correcting code (ECC) type that is utilized in transmitting information via an antenna. In a MIMO system, the ECC type may represent an ECC method, for example, binary convolutional coding (BCC), or low density parity check coding (LDPC). The CON field 566 may comprise 3 bits of binary information. The CON field 566 may indicate the constellation type, or modulation type, which is utilized in transmitting a PSDU via an antenna. In a MIMO system, the modulation type may represent a constellation indicating the number of binary bits that may be encoded in a symbol, for example, binary phase shift keying (BPSK), quaternary phase shift keying (QPSK), 16 level quadrature amplitude modulation (16 QAM), 64 level QAM (64 QAM), or 256 level QAM (256 QAM).

The length field 568 may comprise 13 bits of binary information. The length field 568 may comprise information that indicates the number of binary octets of data payload information, for example, the physical layer service data unit (PSDU) 352. The LPI field 570 may comprise 1 bit of binary information. The LPI field 570 may comprise information that indicates whether the corresponding PSDU 352 represents the last information comprised in a message. The CRC field 574 may comprise 4 bits of binary information. The CRC field 574 may comprise information that may be utilized by a receiver, for example, receiver 201, to detect the presence of errors in a received PPDU. The tail field 576 may comprise 6 bits of binary information. The tail field 576 may comprise information that is appended following the CRC field 574 to pad the Signal-N field to a desired length.

Figure 5C:
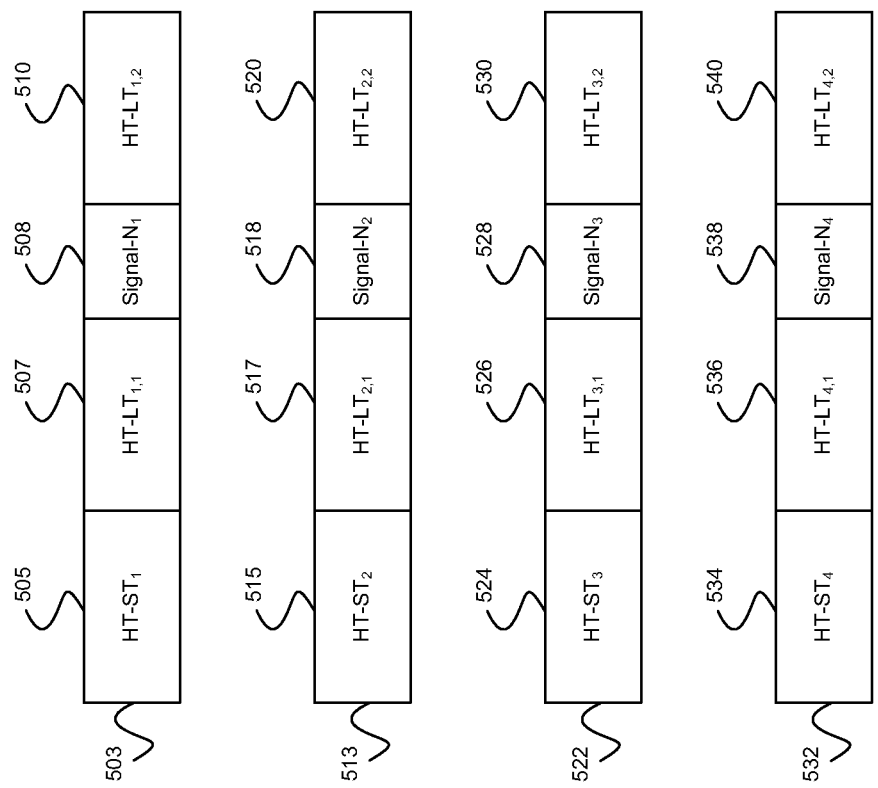
FIG. 5c shows exemplary training fields and header fields for greenfield access in accordance with a WWiSE proposal for $N_{SS}=4$, in accordance with an embodiment of the invention.

FIG. 5c shows exemplary training fields and header fields for greenfield access in accordance with a WWiSE proposal for $N_{SS}$=4, in accordance with an embodiment of the invention. With reference to FIG. 5c, there is shown training fields and a header field for a first spatial stream 503, training fields and a header field for a second spatial stream 513, training fields and a header field for a third spatial stream 522, and training fields and a header field for a fourth spatial stream 532.

The training fields and header field for the first spatial stream 503 may comprise a high throughput short training field HT-$ST_1$ 505, a first HT long training field (HT-$LT_{1,1}$) 507, a Signal-$N_1$ field 508, and a second HT long training field (HT-$LT_{1,2}$) 510. The training fields and header field for the second spatial stream 513 may comprise a high throughput short training field HT-$ST_2$ 515, a first HT long training field (HT-$LT_{2,1}$) 517, a Signal-$N_2$ field 518, and a second HT long training field (HT-$LT_{2,2}$) 520. The training fields and header field for the third spatial stream 522 may comprise a high throughput short training field HT-$ST_3$ 524, a first HT long training field (HT-$LT_{3,1}$) 526, a Signal-$N_3$ field 528, and a second HT long training field (HT-$LT_{1,2}$) 530. The training fields and header field for the fourth spatial stream 532 may comprise a high throughput short training field HT-$ST_4$ 534, a first HT long training field (HT-$LT_{4,1}$) 536, a Signal-$N_4$ field 538, and a second HT long training field (HT-$LT_{4,2}$) 540.

In operation, the training field HT-$ST_2$ 515 may comprise a time shifted representation of the training field HT-$ST_1$ 505. The training field HT-$ST_3$ 524 may comprise a time shifted representation of the training field HT-$ST_2$ 515. The training field HT-$ST_4$ 534 may comprise a time shifted representation of the training field HT-$ST_3$ 524. The training field HT-$LT_{2,1}$ 517 may comprise a time shifted representation of the training field HT-$LT_{1,1}$ 507. The training field HT-$LT_{3,1}$ 526 may comprise a time shifted representation of the training field HT-$LT_{2,1}$ 517. The training field HT-$LT_{4,1}$ 536 may comprise a time shifted representation of the training field HT-$LT_{3,1}$ 526. The signal field Signal-$N_2$ 518 may comprise a time shifted representation of the signal field Signal-$N_1$ 508. The signal field Signal-$N_3$ 528 may comprise a time shifted representation of the signal field Signal-$N_2$ 518. The signal field Signal-$N_4$ 538 may comprise a time shifted representation of the signal field Signal-$N_3$ 528. The training field HT-$LT_{2,2}$ 520 may comprise a time shifted representation of the training field HT-$LT_{1,2}$ 510. The training field HT-$LT_{3,2}$ 530 may comprise a time shifted representation of the training field HT-$LT_{2,2}$ 520. The training field HT-$LT_{4,2}$ 540 may comprise a time shifted representation of the training field HT-$LT_{3,2}$ 530.

The training fields, HT-$ST_1$ 505, HT-$ST_2$ 515, HT-$ST_3$ 524, and HT-$ST_4$ 534, may comprise a time duration of about 8 μs, and further comprise a plurality of OFDM symbols, for example, a plurality of 10 ODFM symbols. The training fields, HT-$LT_{1,1}$ 507, HT-$LT_{1,2}$ 510, HT-$LT_{2,1}$ 517, HT-$LT_{2,2}$ 520, HT-$LT_{3,1}$ 526, HT-$LT_{3,2}$ 530, HT-$LT_{4,1}$ 536, and HT-$LT_{4,2}$ 540, may comprise a time duration of about 8 μs, and further comprise a plurality of OFDM symbols, for example, a plurality of 2 ODFM symbols. The signal fields, Signal-$N_1$ 508 Signal-$N_2$ 518, Signal-$N_3$ 528 and Signal-$N_4$ 538, may comprise a time duration of about 4 μs, and further comprise an OFDM symbol.

Comparing FIG. 5a and FIG. 5c, the exemplary training fields and Signal-N header field illustrated in FIG. 5a, based on 2 spatial streams, 502 and 512, may each be of approximately 20 μs in duration, or equivalent in time duration to 5 IEEE 802.11n OFDM symbols and corresponding guard bands. The exemplary training fields and Signal-N header field illustrated in FIG. 5c, based 4 spatial streams, 503, 513, 522, and 532, may each be of approximately 28 µs in duration, or equivalent in time duration to 7 IEEE 802.11n OFDM symbols and corresponding guard bands.

Figure 6A:
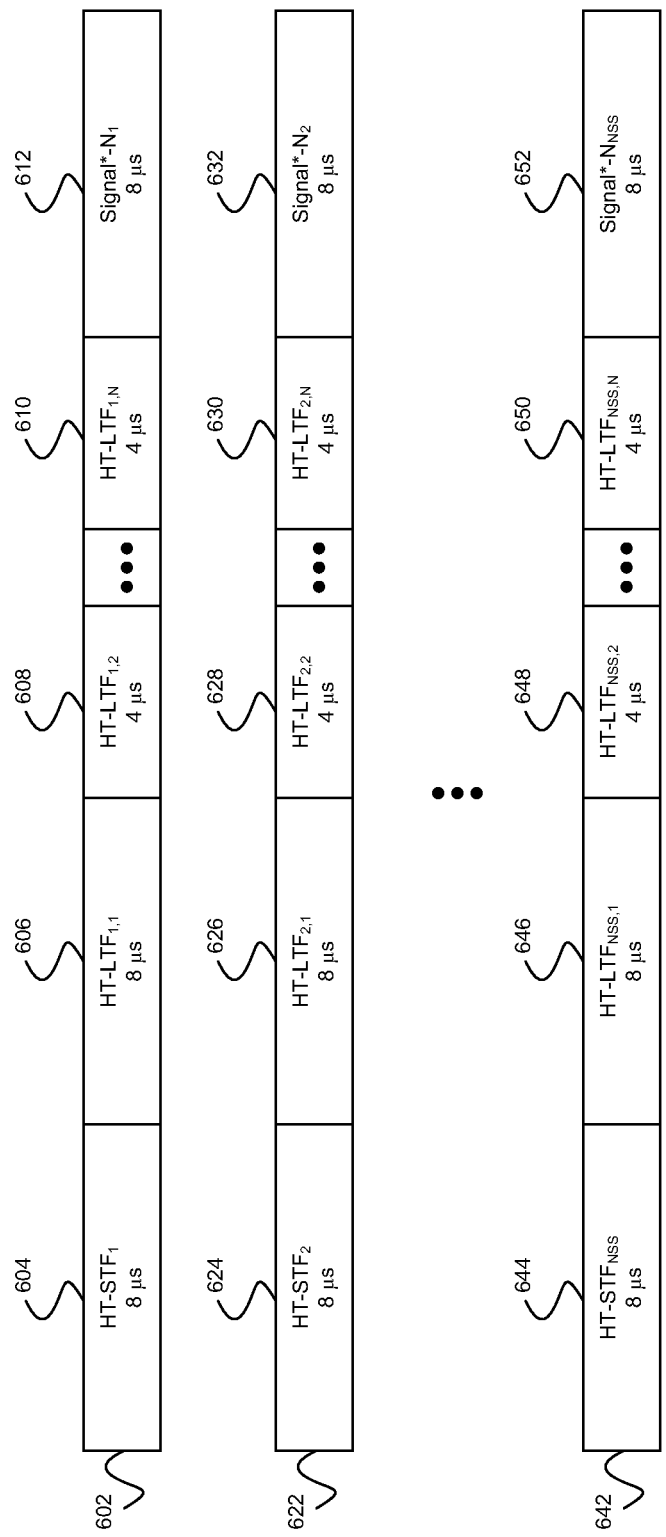
FIG. 6a shows exemplary training fields and header fields with trailing signal field for greenfield access for $N_{SS}>2$, in accordance with an embodiment of the invention.

FIG. 6a shows exemplary training fields and header fields with trailing signal field for greenfield access for $N_{SS}>2$, in accordance with an embodiment of the invention. With reference to FIG. 6a there is shown training fields and a header field for a first spatial stream 602, training fields and a header field for a second spatial stream 622, and training fields and a header field for spatial stream $N_{SS}$ 642. The training fields and header field for the first spatial stream 602 may comprise a short training field HT-STF$_1$ field 604, a long training field HT-LTF$_{1,1}$ field 606, a plurality of subsequent long training fields HT-LTF$_{1,2}$ ... HT-LTF$_{1,N}$ 608 ... 610, and a Signal*–N$_1$ field 612. The training sequence and header field for the second spatial stream 622 may comprise an HT-STF$_2$ field 624, an HT-LTF$_{2,1}$ field 626, a plurality of HT-LTF$_{2,2}$ ... HT-LTF$_{2,N}$ fields 628 ... 630, and a Signal*–N$_2$ field 632. The training sequence and header field for spatial stream $N_{SS}$ 642 may comprise an HT-STF$_{NSS}$ field 644, an HT-LTF$_{NSS,1}$ field 646, a plurality of HT-LTF$_{NSS,2}$ ... HT-LTF$_{NSS,N}$ fields 648 ... 650, and a Signal*–N$_{NSS}$ field 652. The Signal*–N fields 612, 632, and 652 may be represented as shown in FIG. 4c.

In operation, the short training sequence utilized in the training field HT-STF$_1$ 604, STS$_1$, may be represented as a vector comprising a plurality of coefficients. The short training sequence utilized in the training field HT-STF$_2$ 624, STS$_2$, may be represented as a vector comprising a plurality of coefficients. The short training sequence utilized in the training field HT-STF$_{NSS}$ 624, STS$_{NSS}$, may be represented as a vector comprising a plurality of coefficients. Each vector representation among the plurality of vector representations STS$_1$ ... STS$_{NSS}$ may be orthonormal to each of the other vector representations in the plurality of vector representations.

The long training sequence utilized in the first training field of the first spatial stream, HT-LTF$_{1,1}$ 606, LTS$_{1,1}$, may be represented as a vector comprising a plurality of coefficients. The long training sequence utilized in the first training field of the second spatial stream HT-LTF$_{2,1}$ 626, LTS$_{2,1}$, may be represented as a vector comprising a plurality of coefficients. The long training sequence utilized in the first training field of spatial stream $N_{SS}$ HT-LTF$_{NSS,1}$ 646, LTS$_{NSS,1}$, may be represented as a vector comprising a plurality of coefficients. Each vector representation among the plurality of vector representations LTS$_{1,1}$ ... LTS$_{NSS,1}$ may be orthonormal to each of the other vector representations in the plurality of vector representations.

The long training sequence utilized in the second training field of the first spatial stream HT-LTF$_{1,2}$ 608, LTS$_{1,2}$, may be represented as a vector comprising a plurality of coefficients. The long training sequence utilized in the second training field of the second spatial stream HT-LTF$_{2,2}$ 628, LTS$_{2,2}$, may be represented as a vector comprising a plurality of coefficients. The long training sequence utilized in the second training field of spatial stream $N_{SS}$ HT-LTF$_{NSS,2}$ 648, LTS$_{NSS,2}$, may be represented as a vector comprising a plurality of coefficients. Each vector representation among the plurality of vector representations LTS$_{1,2}$ ... LTS$_{NSS,2}$ may be orthonormal to each of the other vector representations in the plurality of vector representations.

The long training sequence utilized in the training field N of the first spatial stream HT-LTF$_{1,N}$ 610, LTS$_{1,N}$, may be represented as a vector comprising a plurality of coefficients. The long training sequence utilized in the training field N of the second spatial stream HT-LTF$_{2,N}$ 630, LTS$_{2,N}$, may be represented as a vector comprising a plurality of coefficients. The long training sequence utilized in the training field N of spatial stream $N_{SS}$ HT-LTF$_{NSS,N}$ 650, LTS$_{NSS,N}$, may be represented as a vector comprising a plurality of coefficients. Each vector representation among the plurality of vector representations LTS$_{1,N}$ ... LTS$_{NSS,N}$ may be orthonormal to each of the other vector representations in the plurality of vector representations. The number of long training fields, N, may be approximately equal to the number of spatial streams, $N_{SS}$.

Orthonormality is a property of vectors such that for any two vectors, X and Y, the vector dot product of the vectors may equal zero. When applied to long training sequences, the property of orthonormality may result in the generation of long training sequences whose vector representations exhibit the property of orthonormality. The generation of an orthonormal long training sequence may produce phase shifts among the frequency subcarriers that comprise an OFDM symbol generated based on the long training sequence. The phase shifts may improve the quality of transmitted OFDM symbols by reducing the likelihood of accidental nulls in the beam pattern of the signals transmitted by a transmitter 200 (FIG. 2b). The utilization of known phase shifts among the frequency subcarriers may enable a receiver 201 to remove the phase shifts in a received signal during channel estimation. The placement of the Signal*–N fields 612, 632, and 652 following the corresponding pluralities of long training sequence fields in each of the spatial streams may enable a receiver to utilize a full channel estimate, based on the preceding long training fields for each spatial stream, for example, long training sequence fields 606 and 608 ... 610 in the first spatial stream, in detecting the corresponding Signal*–N field.

In MIMO systems, orthonormal sequences may enable a receiver 201 (FIG. 1) to more easily distinguish a signal transmitted from a specific transmitter antenna front end 214a ... 214n at a transmitter 200. A matched filter at receiver antenna front ends 216a ... 216n at the receiver 201 may enable the receiver to receive a signal transmitted by a specific transmitter antenna front end 214a ... 214n at a specific receiver antenna front end 216a ... 216n.

The training fields, HT-STF$_1$ 604, HT-STF$_2$ 624, and HT-STF$_{NSS}$ 644, may comprise a time duration of about 8 µs, and further comprise a plurality of OFDM symbols, for example, a plurality of 10 ODFM symbols. The training fields, HT-LTF$_{1,1}$ 606, HT-LTF$_{2,1}$ 626, and HT-LTF$_{NSS,1}$ 646, may comprise a time duration of about 8 µs, and further comprise a plurality of OFDM symbols, for example, a plurality of 2 ODFM symbols. The plurality of OFDM symbols in training field 606 may be identical. The plurality of OFDM symbols in training field 626 may be identical. The plurality of OFDM symbols in training field 646 may be identical. The pluralities of training fields, HT-LTF$_{L2}$ ... HT-LTF$_{1,N}$ 608 ... 610, HT-LTF$_{2,2}$ ... HT-LTF$_{2,N}$ 628 ... 630, and HT-LTF$_{NSS,2}$ ... HT-LTF$_{NSS,N}$ 648 ... 650, may comprise a time duration of about 4 µs, and further comprise an OFDM symbol. Utilizing orthonormal training sequences after the first long training sequence may obviate tone interleaving, which may be a desirable feature because the first long training sequence may utilize identical symbols. The signal fields, Signal*-$N_1$ 612, Signal*-$N_2$ 632, and Signal*-$N_{NSS}$ 652, may comprise a time duration of about 8 μs, and further comprise a plurality of OFDM symbols, for example, a plurality of 2 OFDM symbols.

For $N_{SS}$=2 there may be a plurality of N=2 long training fields in exemplary training fields and header field 602, 622, or 642. Referring to FIG. 6a for the case of 2 transmitted spatial streams, the training fields and Signal*-N header field 602, 622, and 642 may comprise a time duration of about 28 μs, and further comprise a plurality of 7 IEEE 802.11n OFDM symbols. For the case of 3 transmitted spatial streams, the training fields and header field 602, 622, and 642 may comprise a time duration of about 32 μs, and further comprise a plurality of 8 IEEE 802.11n OFDM symbols. For the case of 4 transmitted spatial streams, the training fields and header field 602, 622, and 642 may comprise a time duration of about 36 μs, and further comprise a plurality of 9 IEEE 802.11n OFDM symbols.

Comparing the training fields and header field 402, 422, or 442 (FIG. 4a) for mixed mode access in an IEEE 802.11n WLAN to comparable training fields and header field 602, 622, or 642 (FIG. 6a) for greenfield access in an IEEE 802.11n WLAN for the case of 2 transmitted spatial streams may indicate that the training fields and header field 602, 622, or 642 may comprise a time duration that is approximately 16 us shorter in duration than that of comparable training fields and header field 402, 422, or 442. This may correspond to a reduction of 4 fewer IEEE 802.11n OFDM symbols transmitted with each physical layer protocol data unit (PPDU).

In various embodiments of the invention, as illustrated in the exemplary training fields and header field in FIG. 6a, the Signal*-N field be represented as described in FIG. 4c. The Signal*-N field may comprise a time duration of approximately 8 μs, and further comprise 2 OFDM symbols. Each of the first high throughput long training fields among the spatial streams, HT-$LTF_{1,1}$ 606, HT-$LTF_{2,1}$ 626, and HT-$LTF_{NSS,1}$ 646 may comprise a time duration of approximately 8 μs, and further comprise 2 OFDM symbols. Each of the first high throughput long training fields among the spatial streams, HT-$LTF_{1,1}$ 606, HT-$LTF_{2,1}$ 626, and HT-$LTF_{NSS,1}$ 646 may comprise identical OFDM symbols that may be utilized for fine frequency offset estimation as may be specified in IEEE resolutions 802.11a, and 802.11g.

Figure 6B:
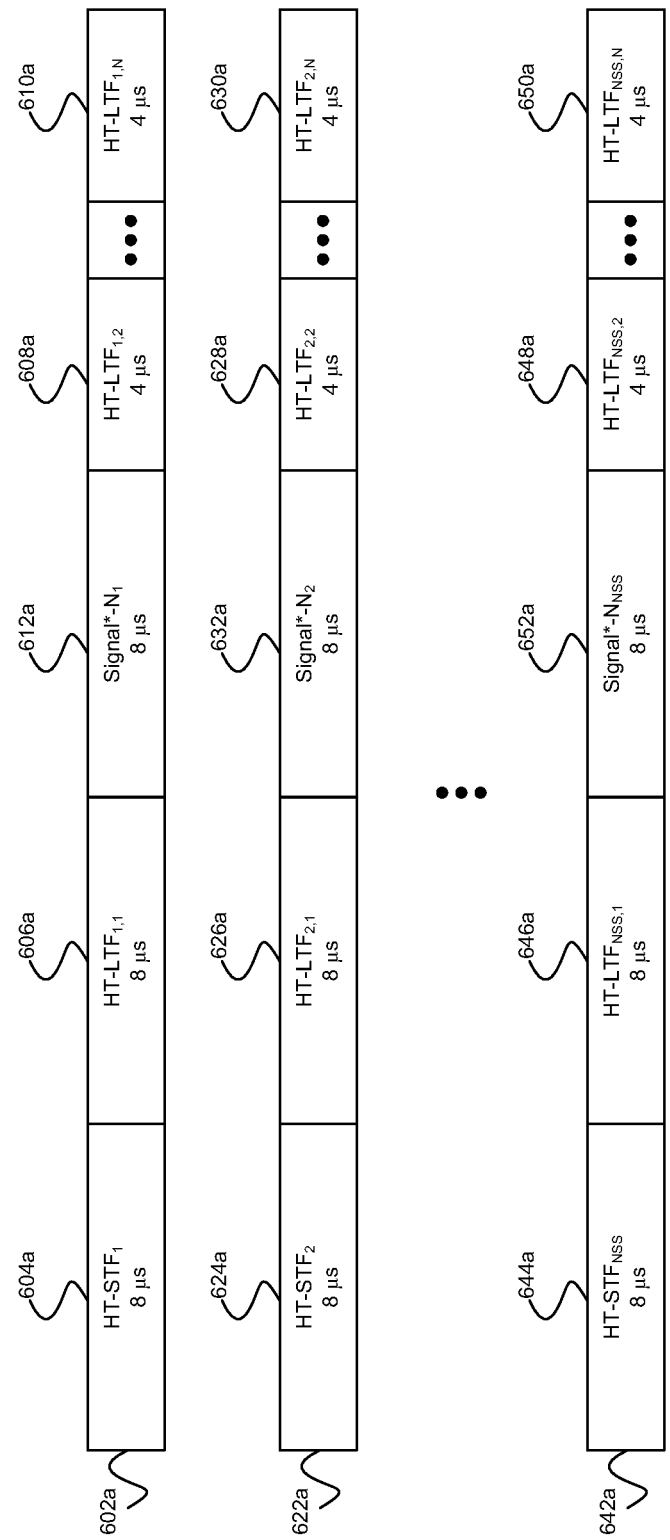
FIG. 6b shows exemplary training fields and header fields with early signal field for greenfield access for $N_{SS}>2$, in accordance with an embodiment of the invention.

FIG. 6b shows exemplary training fields and header fields with early signal field for greenfield access for $N_{SS}$>2, in accordance with an embodiment of the invention. FIG. 6b differs from FIG. 6a in that, in FIG. 6b, a signal field may follow a first long training field in a spatial stream PDU, with one or more subsequent long training fields following the signal field. With reference to FIG. 6b, there is shown training fields and a header field for a first spatial stream 602a, training fields and a header field for a second spatial stream 622a, and training fields and a header field for spatial stream $N_{SS}$ 642a. The training fields and header field for the first spatial stream 602a may comprise a short training field HT-$STF_1$ field 604a, a long training field HT-$LTF_{1,1}$ field 606a, a plurality of subsequent long training fields HT-$LTF_{1,2}$ ... HT-$LTF_{1,N}$ 608a ... 610a, and a Signal*-$N_1$ field 612a. The training sequence and header field for the second spatial stream 622a may comprise an HT-$STF_2$ field 624a, an HT-$LTF_{2,1}$ field 626a, a plurality of HT-$LTF_{2,2}$ ... HT-$LTF_{2,N}$ fields 628a ... 630a, and a Signal*-$N_2$ field 632a. The training sequence and header field for spatial stream $N_{SS}$ 642a may comprise an HT-$STF_{NSS}$ field 644a, an HT-$LTF_{NSS,1}$ field 646a, a plurality of HT-$LTF_{NSS,2}$ ... HT-$LTF_{NSS,N}$ fields 648a ... 650a, and a Signal*-$N_{NSS}$ field 652a.

Long training sequences may be utilized for generating OFDM symbols that may be transmitted during long training fields. Long training sequences for $N_{SS}$=2 may be defined as follows:

$$HT\text{-}LTF[i,j] = \begin{bmatrix} .11aLT & .11aLT \\ -.11aLT * e^{j*theta(k)} & .11aLT * e^{j*theta(k)} \end{bmatrix} \quad \text{equation [7]}$$

where the index, i, may represent a row in the matrix, and the index, j, may represent a column. Each row may represent a corresponding spatial stream, with each column representing a corresponding long training sequence, 0.11a LT indicates that the training sequence may be based on specifications in IEEE 802.11a, theta(k) may indicate a phase shift in the LT field for OFDM subcarrier k in an RF channel where the phase shift may vary as a function of the index k.

Individual elements in the long training sequence, 0.11aLT, based on IEEE 802.11a for a 20 MHz channel, may be represented utilizing the vector notation, LS[k], where k may comprise a range of integer values from and including $-N_{sc}/2$, up to and including $N_{sc}/2$. as:

0.11aLT={1,1,1,1,-1,-1,1,1,-1,1,-1,1,1,1,1,1,1,-1,- 1,1,1,-1,1,-1,1,1,1,1,0,1,-1,-1,1,1,-1,1,-1,1,- 1,-1,-1,-1,1,1,-1,-1,1,1,-1,1,-1,1,1,1,1,1,-1,- 1}     equation[8]

where the first element in equation[8] may represent LS[$-N_{sc}/2$] and the last element may represent LS[$N_{sc}/2$].

A long OFDM training symbol, $r_{LONG}(t)$, where the variable t may represent time, may be generated according to the equation:

$$r_{LONG}(t) = w_{TLONG}(t) \sum_{k=-N_{sc}/2}^{N_{sc}/2} LS[k] e^{j2\pi 2\Delta_F(t-T_{GI2})} \quad \text{equation [9]}$$

where $N_{sc}$ may represent the number of frequency subcarriers, $\Delta_F$ may represent the frequency spacing between subcarriers, $T_{GI2}$ may represent the training symbol guard band time interval, and $w_{TLONG}(t)$ may represent the timing window for the long training sequence. The timing window $w_{TLONG}(t)$ may be represented as:

$$w_T(nT_s) = \begin{cases} 1 & 1 \le n \le 79 \\ 0.5 & 0, 80 \\ 0 & \text{otherwise} \end{cases}, \text{where} \quad \text{equation [10]}$$

the sampling interval, $T_s$, may equal approximately 50 ns for a 20 MHz channel, and n may represent a sample of the OFDM signal as represented by equation[9] taken at a time $t=nT_s$ during a timing window interval for transmission of an OFDM symbol.

With reference to equation[9] for $N_{SS}$=2, substitution of a long training sequence element HT-LTF[i,j] from equation[7] for LS[k] in equation[9] may be utilized to generate an OFDM symbol for the $j^{th}$ long training field in the $i^{th}$ spatial stream. In the first long training field, the OFDM symbol generated by equation[9] may be transmitted twice.

The LT fields may be defined for $N_{SS}=3$ as follows:

$$HT\text{-}LTF[i,j] = \begin{bmatrix} .11aLT*W11 & .11aLT*W12 & .11aLT*W13 \\ .11aLT*W21*e^{j*theta(k)} & .11aLT*W22*e^{j*theta(k)} & .11aLT*W22*e^{j*theta(k)} \\ .11aLT*W31*e^{j*phi(k)} & .11aLT*W32*e^{j*phi(k)} & .11aLT*W33*e^{j*phi(k)} \end{bmatrix} \quad \text{equation [11]}$$

where the index, i, may represent a row in the matrix, and the index, j, may represent a column. Each row may represent a corresponding spatial stream, with each column representing a corresponding long training sequence. $W_{mn}$ may represent elements from a discrete Fourier transform (DFT) matrix, and phi(k) indicates a phase shift in the LT field for OFDM subcarrier k where the phase shift varies as a function of k where phi(k) may not equal theta(k).

The DFT matrix, $W_{mn}$, may be represented as:

$$W_{mn} = \begin{bmatrix} 1 & 1 & 1 \\ 1 & \frac{-1-i\sqrt{3}}{2} & \frac{-1+i\sqrt{3}}{2} \\ 1 & \frac{-1+i\sqrt{3}}{2} & \frac{-1-i\sqrt{3}}{2} \end{bmatrix}, \text{ where} \quad \text{equation [12]}$$

the index, m, may represent a row in the matrix, and the index, n, may indicate a column.

With reference to equation[9] for $N_{SS}=3$, substitution of a long training sequence element HT-LTF[i,j] from equation [11] for LS[k] in equation[9] may be utilized to generate an OFDM symbol for the $j^{th}$ long training field in the $i^{th}$ spatial stream. In the first long training field, the OFDM symbol generated by equation[9] may be transmitted twice.

The LT fields may be defined for $N_{SS}=4$ as follows:

$$HT\text{-}LTF[i,j] = \begin{bmatrix} -1*.11aLT & .11aLT & .11aLT & .11aLT \\ .11aLT*e^{j*theta(k)} & -1*.11aLT*e^{j*theta(k)} & .11aLT*e^{j*theta(k)} & .11aLT*e^{j*theta(k)} \\ .11aLT*e^{j*phi(k)} & .11aLT*e^{j*phi(k)} & -1*.11aLT*e^{j*phi(k)} & .11aLT*e^{j*phi(k)} \\ .11aLT*e^{j*psi(k)} & .11aLT*e^{j*psi(k)} & .11aLT*e^{j*psi(k)} & -1*.11aLT*e^{j*phi(k)} \end{bmatrix} \quad \text{equation [13]}$$

where the index, i, may represent a row in the matrix, and the index, j, may represent a column. Each row may represent a corresponding spatial stream, with each column representing a corresponding long training sequence. phi(k) indicates a phase shift in the LT field for OFDM subcarrier k where the phase shift varies as a function of k. psi(k) indicates a phase shift in the LT field for OFDM subcarrier k where the phase shift varies as a function of k. The phase shifts phi(k), theta(k), and psi(k) may not be equal.

With reference to equation[9] for $N_{SS}=4$, substitution of a long training sequence element HT-LTF[i,j] from equation [13] for LS[k] in equation[9] may be utilized to generate an OFDM symbol for the $j^{th}$ long training field in the $i^{th}$ spatial stream. In the first long training field, the OFDM symbol generated by equation[9] may be transmitted twice.

The long training sequence as represented in equation[8] may be utilized to generate a plurality of orthonormal long training sequences. Alternatively, orthonormal long training sequence fields may be generated. If the long training sequences in different long training sequence fields are orthonormal, the corresponding long training sequence fields may also be orthonormal. Orthonormal long training sequences or long training sequence fields may be generated by a plurality of methods. In one embodiment of the invention, orthonormal long training sequence fields may be generated by utilizing a discrete Fourier transform matrix to apply phase shifts to individual long training sequence fields among a plurality of long training sequence fields in a spatial stream. The utilization of a discrete Fourier transform matrix may enable the orthonormal generator sequence to be of minimum length. The property of orthonormality may be observed in that a long training sequence field in a current spatial stream may be orthogonal to a corresponding long training sequence field in a subsequent spatial stream. A plurality of orthogonal long training sequences fields, HT-LTF$_n$[i,j], for a plurality of spatial streams may be generated according to the following relationship:

$$HT\text{-}LTF_n[i,j]=HT\text{-}LTF[i,j]e^{\times 2\pi ij/N_{ss}}, \text{ where} \quad \text{equation[14]}$$

the index i may refer to an individual spatial stream among a plurality of spatial streams, the index j may refer to an individual long training sequence field within a spatial stream, $N_{ss}$ may refer to the number of transmitted spatial streams, and HT-LTF[i,j] may refer to an individual long training sequence field as represented in any of equations[7], [11], or [13]. As an example of the property of orthonormality, a $j^{th}$ high throughput long training sequence field for a first spatial stream HT-LTF$_n$[1,j] may be orthonormal to a corresponding $j^{th}$ high throughput long training sequence field for a second spatial stream HT-LTF$_n$[2,j].

In another embodiment of the invention, a discrete Hadamard transform may be utilized to generate orthonormal long training sequences based on a Hadamard matrix. A property of a Hadamard matrix is that the matrix may comprise values of +1 and −1 such that the rows of the Hadamard matrix may be mutually orthogonal. For example, a long training sequence, O(0.11aLT), that may be orthonormal to the long training sequence 0.11aLT as expressed in equation [8] is:

$$O(0.11aLT)=\{1,-1,1,-1,-1,1,1,-1,-1,-1,-1,1,1,-1,$$
$$1,-1,1,1,-1,-1,1,1,1,1,1,-1,1,-1,0,1,1,-1,-1,1,1,$$
$$1,1,1,1,-1,1,-1,1,1,-1,-1,1,1,1,1,1,1,-1,1,-1,-1,$$
$$1\} \quad \text{equation[15]}$$

Various embodiments of the invention may not be limited in the methods that may be utilized in generating orthonormal long training sequences or orthonormal long training sequence fields.

Figure 7:
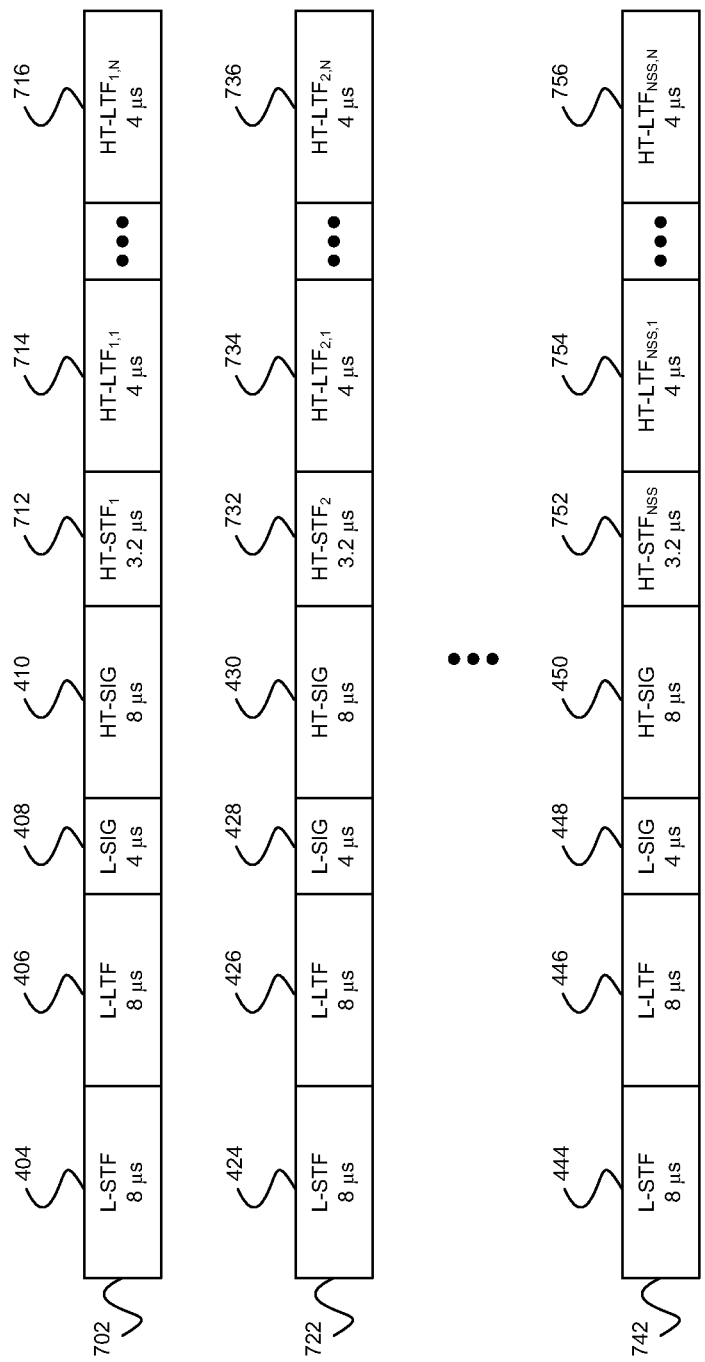
FIG. 7 shows exemplary training fields and header fields for mixed mode access for $N_{SS}>2$, in accordance with an embodiment of the invention.

FIG. 7 shows exemplary training fields and header fields for mixed mode access for $N_{SS}>2$, in accordance with an embodiment of the invention. With reference to FIG. 7, there is shown a plurality of PPDU preambles and headers 702, 722, and 742. The preamble and header 702 may comprise a legacy short training field (L-STF) 404, a legacy long training field (L-LTF) 406, a legacy signal field (L-SIG) 408, a high throughput signal field (HT-SIG) 410, a high throughput short training field for the first spatial stream (HT-STF$_1$) 712, and a plurality of high throughput long training fields for the first spatial stream comprising training fields number 1 through N (HT-LTF$_{1,1}$ ... HT-LTF$_{1,N}$) 714 ... 716. The integer value N may represent the number of long training fields contained in the preamble and header 702.

The preamble and header 722 may comprise a legacy short training field (L-STF) 424, a legacy long training field (L-LTF) 426, a legacy signal field (L-SIG) 428, a high throughput signal field (HT-SIG) 430, a high throughput short training field for the second spatial stream (HT-STF$_2$) 732, and a plurality of high throughput long training fields for the second spatial stream comprising training fields number 1 through N (HT-LTF$_{2,1}$ ... HT-LTF$_{2,N}$) 734 ... 736. The integer value N may represent the number of long training fields contained in the preamble and header 722.

The preamble and header 742 may comprise a legacy short training field (L-STF) 444, a legacy long training field (L-LTF) 446, a legacy signal field (L-SIG) 448, a high throughput signal field (HT-SIG) 450, a high throughput short training field for the spatial stream N$_{SS}$ (HT-STF$_{NSS}$) 752, and a plurality of high throughput long training fields for the spatial stream N$_{SS}$ comprising training fields number 1 through N (HT-LTF$_{NSS,1}$ ... HT-LTF$_{NSS,N}$) 754 ... 756. The integer value N may represent the number of long training fields contained in the preamble and header 702.

The HT-STF fields 712, 732, and 752 may each comprise a time duration of about 3.2 µs, and the HT-LTF fields 714 ... 716, 734 ... 736, and 754 ... 756 may each comprise a time duration of about 4 µs. The time duration of about 3.2 µs for the HT-STF fields 712, 732, and 752 may represent an increase of about 800 ns in time duration relative to the corresponding time duration of about 2.4 µs for the HT-STF fields 412, 432, and 452. The increase of about 800 ns in time duration may allow more time for automatic gain control settling in adapting transmission of signals to utilize beamforming.

Comparing the training fields and header fields 702, 722, and 742 to the comparable the training fields and header fields 402, 422, and 442 for the case of 2 transmitted spatial streams, wherein N=2, may indicate that the training fields and header fields 702, 722, and 742 may comprise a time duration about 5.6 µs shorter than for the comparable training fields and header fields 402, 422, and 442. Comparing the training fields and header fields 702, 722, and 742 to the comparable the training fields and header fields 402, 422, and 442 for the case of 3 transmitted spatial streams, wherein N=3, may indicate that the training fields and header fields 702, 722, and 742 may comprise a time duration of about 8.8 µs shorter than for the comparable training fields and header fields 402, 422, and 442. Comparing the training fields and header fields 702, 722, and 742 to the comparable the training fields and header fields 402, 422, and 442 for the case of 4 transmitted spatial streams, wherein N=2, may indicate that the training fields and header fields 702, 722, and 742 may comprise a time duration about 12 µs shorter than for the comparable training fields and header fields 402, 422, and 442.

Various embodiments of the invention may provide a system for communicating information in a multiple input multiple output (MIMO) communications system that may comprise a transmitter 200 (FIG. 2b) that generates a protocol data unit (PDU) for a current spatial stream comprising a current plurality of long training sequence fields. The transmitter 200 may generate a PDU for a subsequent spatial stream comprising a subsequent plurality of long training sequence fields wherein one of the subsequent plurality of long training sequence fields is orthonormal to a corresponding one of the current plurality of long training sequence fields. The transmitter 200 may append a signal field subsequent to the last of the plurality of long training sequence fields.

Various embodiments of the invention may provide a system for communicating information in a multiple input multiple output (MIMO) communications system that may comprise a transmitter that constructs a greenfield protocol data unit (PDU) comprising a high throughput short training sequence field comprising a time duration of approximately 8 µs. The transmitter may append a first long training sequence field, comprising a time duration of approximately 8 µs, subsequent to the thigh throughput short training sequence field. The transmitter may also append at least one subsequent long training sequence field, comprising a time duration of approximately 4 µs, subsequent to the first long training sequence field. In addition, the transmitter may append a signal field, comprising a time duration of approximately 8 µs, subsequent to the last of at least one subsequent long training sequence field.

Aspects of a method for communicating information in a multiple input multiple output (MIMO) communications system that may comprise constructing a greenfield protocol data unit (PDU) comprising a high throughput short training sequence field comprising a time duration of approximately 8 µs. The method may further comprise appending a first long training sequence field, comprising a time duration of approximately 8 µs, subsequent to the high throughput short training sequence field. At least one subsequent long training sequence field, comprising a time duration of approximately 4 µs, may be appended subsequent to the first long training sequence field. A signal field, comprising a time duration of approximately 8 µs, may also be appended subsequent to the last of at least one subsequent long training sequence field.

Aspects of a method for communicating information in a multiple input multiple output (MIMO) communications system may comprise constructing a mixed mode protocol data unit (PDU) comprising a legacy short training sequence field comprising a time duration of approximately 8 µs. A legacy long training sequence field comprising a time duration of approximately 8 µs may be appended. A legacy signal field comprising a time duration of approximately 4 µs may be appended. The method may comprise appending a high throughput signal field, comprising a time duration of approximately 8 µs, subsequent to the legacy signal field. The method may further comprise appending a high throughput short training sequence field comprising a time duration of approximately 3.2 µs, subsequent to the high throughput signal field, and subsequently appending a plurality of long training sequence fields, comprising a time duration of approximately 4 µs.

Accordingly, the present invention may be realized in hardware, software, or a combination of hardware and software. The present invention may be realized in a centralized fashion in at least one computer system, or in a distributed fashion where different elements are spread across several interconnected computer systems. Any kind of computer system or other apparatus adapted for carrying out the methods described herein is suited. A typical combination of hardware and software may be a general-purpose computer system with a computer program that, when being loaded and executed, controls the computer system such that it carries out the methods described herein.

The present invention may also be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

While the present invention has been described with reference to certain embodiments, it will be understood by those skilled in the art that various changes may be made and equivalents may be substituted without departing from the scope of the present invention. In addition, many modifications may be made to adapt a particular situation or material to the teachings of the present invention without departing from its scope. Therefore, it is intended that the present invention not be limited to the particular embodiment disclosed, but that the present invention will include all embodiments falling within the scope of the appended claims.

What is claimed is:

1. A communication device comprising:
   at least one communication interface to receive a signal adapted for Greenfield access via a plurality of antennas, wherein:
      the signal including, for a first spatial stream, a first HT (high throughput) short training field (STF) followed by a first single HT long training field (LTF) followed by a first signal (SIG) field followed by a first plurality of HT LTFs followed by a first data field, wherein the first plurality of HT LTFs have the same collective duration as the first single HT LTF;
      the signal also including, for a second spatial stream, a second HT-STF, a second single HT LTF, a second SIG field, and a second plurality of HT LTFs wherein the second plurality of HT LTFs have the same collective duration as the second single HT LTF; and
      the first plurality of HT LTFs having a corresponding plurality of single symbols and the second plurality of HT LTFs having a corresponding plurality of single symbols; and
   wherein:
      the second HT-STF being a cyclic diversity delay shifted version of the first HT-STF;
      the second single HT LTF being a cyclic diversity delay shifted version of the first single HT LTF;
      the second SIG field being a cyclic diversity delay shifted version of the first SIG field; and
      at least one of the second plurality of HT LTFs being a cyclic diversity delay shifted version of at least one of the first plurality of HT LTFs; and
      wherein the at least one communication interface includes low noise amplification circuitry and wherein the at least one communication interface extracts and uses at least one of: the first HT-STF or the second HT-STF, for automatic gain control (AGC) of the low noise amplification circuitry.

2. The communication device of claim 1, wherein:
   the first SIG field or the second SIG field including at least one field to indicate a number of spatial streams corresponding to the signal.

3. The communication device of claim 1, wherein the signal is further used by the at least one communication interface for signal detection.

4. The communication device of claim 1, wherein the at least one communication interface uses at least one of: the first HT-STF or the second HT-STF, for diversity selection performed by rake receiver circuitry.

5. The communication device of claim 1, wherein the at least one communication interface uses the signal for coarse frequency offset estimation.

6. The communication device of claim 1, wherein the at least one communication interface uses the signal for timing synchronization.

7. The communication device of claim 1, wherein the communication device is a wireless station (STA).

8. The communication device of claim 1, wherein the communication device is an access point (AP).

9. A communication device, comprising:
   at least one communication interface to receive a signal via a plurality of transmit antennas from at least one additional communication device having a plurality of transmit antennas, wherein the signal including, for at least one spatial stream, a HT (high throughput) short training field (STF) followed by a single HT long training field (LTF) followed by a signal (SIG) field followed by a plurality of HT LTFs having a corresponding plurality of single symbols followed by a data field; and
   wherein the HT-STF, the single HT LTF, the SIG field, and the plurality of HT LTFs include a first HT-STF, a first single HT LTF, a first SIG field, and a first plurality of HT LTFs, respectively, for a first spatial stream wherein the first plurality of HT LTFs have the same collective duration as the first single HT LTF, and the signal also includes a second HT-STF, a second single HT LTF, a second SIG field, and a second plurality of HT LTFs, respectively, for a second spatial stream wherein the second plurality of HT LTFs have the same collective duration as the second single HT LTF;
   wherein, at least one of:
   the second HT-STF being a cyclic diversity delay shifted version of the first HT-STF;
   the second single HT LTF being a cyclic diversity delay shifted version of the first single HT LTF;
   the second SIG field being a cyclic diversity delay shifted version of the first SIG field; and
   at least one of the second plurality of HT LTFs being a cyclic diversity delay shifted version of at least one of the first plurality of HT LTFs; and
   wherein the at least one communication interface extracts and uses at least one of: the first HT-STF or the second HT-STF, for automatic gain control (AGC) for low noise amplification circuitry.

10. The communication device of claim 9, wherein:
   the first SIG field or the second SIG field including at least one field to indicate a number of transmit antennas corresponding to the signal.

11. The communication device of claim 9, wherein the at least one communication interface uses the signal for signal detection.

12. The communication device of claim 9, wherein the at least one communication interface further uses at least one of: the first HT-STF or the second HT-STF, for diversity selection performed by rake receiver circuitry.

13. The communication device of claim 9, wherein the at least one communication interface uses the signal for coarse frequency offset estimation.

14. The communication device of claim 9, wherein the at least one communication interface uses the signal for timing synchronization.

15. The communication device of claim 9, wherein the communication device is a wireless station (STA) and the at least one additional communication device is an access point (AP).

16. The communication device of claim 9, wherein the communication device is an AP and the at least one additional communication device is a STA.

17. A method for operating a communication device, the method comprising:

receiving, via at least one communication interface of the communication device, a signal via a plurality of receive antennas from at least one additional communication device having a plurality of transmit antennas;

wherein the signal including, for at least one spatial stream, a HT (high throughput) short training field (STF) followed by a single HT long training field (LTF) followed by a signal (SIG) field followed by a plurality of HT LTFs having a corresponding plurality of single symbols followed by a data field; and wherein the HT-STF, the single HT LTF, the SIG field, and the plurality of HT LTFs including a first HT-STF, a first single HT LTF, a first SIG field, and a first plurality of HT LTFs, respectively, for a first spatial stream wherein the first plurality of HT LTFs have the same collective duration as the first single HT LTF, and the signal also including, a second HT-STF, a second single HT LTF, a second SIG field, and a second plurality of HT LTFs, respectively, for a second spatial stream wherein the second plurality of HT LTFs have the same collective duration as the second single HT LTF;

wherein, at least one of:

the second HT-STF being a cyclic diversity delay shifted version of the first HT-STF;

the second single HT LTF being a cyclic diversity delay shifted version of the first single HT LTF;

the second SIG field being a cyclic diversity delay shifted version of the first SIG field; and at least one of the second plurality of HT LTFs being a cyclic diversity delay shifted version of at least one of the first plurality of HT LTFs; and wherein the at least one communication interface extracts and uses at least one of: the first HT-STF or the second HT-STF, for automatic gain control (AGC) for low noise amplification circuitry.

18. The method of claim 17, wherein:

the HT-STF having an 8 micro-sec duration;

the single HT LTF having an 8 micro-sec duration;

the SIG field having an 8 micro-sec duration; and each of the plurality of HT LTFs having a respective 4 micro-sec duration.

19. The method of claim 17, wherein:

the first SIG field or the second SIG field including at least one field to indicate a number of transmit antennas corresponding to the signal.

20. The method of claim 17, wherein the at least one communication interface further uses the signal for diversity selection performed by rake receiver circuitry.

* * * * *